US012598314B2

(12) United States Patent
Wang et al.

(10) Patent No.: US 12,598,314 B2
(45) Date of Patent: Apr. 7, 2026

(54) NEURAL NETWORK BASED FILTERING PROCESS FOR MULTIPLE COLOR COMPONENTS IN VIDEO CODING

(71) Applicant: QUALCOMM Incorporated, San Diego, CA (US)

(72) Inventors: Hongtao Wang, San Diego, CA (US); Samuel James Eadie, Munich (DE); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 18/331,674

(22) Filed: Jun. 8, 2023

(65) Prior Publication Data

US 2024/0015312 A1     Jan. 11, 2024

Related U.S. Application Data

(60) Provisional application No. 63/367,713, filed on Jul. 5, 2022.

(51) Int. Cl.
| | |
|---|---|
| *H04N 19/186* | (2014.01) |
| *H04N 19/124* | (2014.01) |
| *H04N 19/176* | (2014.01) |
| *H04N 19/42* | (2014.01) |
| *H04N 19/70* | (2014.01) |
| *H04N 19/80* | (2014.01) |

(52) U.S. Cl.
CPC ......... *H04N 19/186* (2014.11); *H04N 19/124* (2014.11); *H04N 19/176* (2014.11); *H04N 19/42* (2014.11); *H04N 19/70* (2014.11); *H04N 19/80* (2014.11)

(58) Field of Classification Search
CPC .... H04N 19/124; H04N 19/186; H04N 19/42; H04N 19/70; H04N 19/80
See application file for complete search history.

(56) References Cited

U.S. PATENT DOCUMENTS

| | | | |
|---|---|---|---|
| 2019/0273948 A1* | 9/2019 | Yin | H04N 19/172 |
| 2020/0244997 A1* | 7/2020 | Galpin | H04N 19/82 |
| 2021/0329286 A1* | 10/2021 | Wang | G06N 3/09 |

(Continued)

FOREIGN PATENT DOCUMENTS

| | | | | |
|---|---|---|---|---|
| WO | WO-2023245194 A1 * | 12/2023 | | H04N 19/82 |
| WO | WO-2023245544 A1 * | 12/2023 | | H04N 19/82 |

OTHER PUBLICATIONS

"Joint Luma and Chroma Multi-Scale CNN In-loop Filter for Versatile Video Coding"—Zhao et al., 978-1-6654-8485-5/22/$31.00 A © 2022 IEEE (Year: 2022).*

(Continued)

*Primary Examiner* — Mainul Hasan
(74) *Attorney, Agent, or Firm* — QUALCOMM Incorporated

(57) ABSTRACT

A method of processing video data includes receiving a syntax element that defines a filtering mode for a neural network (NN) model for both a first color component and a second color component, applying an instance of the NN model, in the defined filtering mode, to a first block of the first color component to generate a first filtered block, and storing the first filtered block for a coding unit (CU).

19 Claims, 9 Drawing Sheets

(56) References Cited

U.S. PATENT DOCUMENTS

| | | | | |
|---|---|---|---|---|
| 2022/0103816 A1 | 3/2022 | Karczewicz et al. | | |
| 2022/0103864 A1* | 3/2022 | Wang | | H04N 19/192 |
| 2022/0191483 A1* | 6/2022 | Li | | H04N 19/82 |
| 2022/0215593 A1 | 7/2022 | Wang et al. | | |
| 2022/0329837 A1* | 10/2022 | Li | | H04N 19/157 |
| 2022/0394308 A1* | 12/2022 | Li | | H04N 19/82 |
| 2023/0319314 A1* | 10/2023 | Ma | | H04N 19/186 |
| | | | | 375/240.12 |
| 2025/0119541 A1* | 4/2025 | Li | | G06N 3/0464 |
| 2025/0119543 A1* | 4/2025 | Xie | | H04N 19/42 |

OTHER PUBLICATIONS

"Revisiting the Sample Adaptive Offset post-filter of VVC with Neural-Networks"—Bordes et al., 2021 Picture Coding Symposium (PCS) | 978-1-6654-2545-2/21/$31.00 Â© 2021 IEEE (Year: 2021).*

Alshina E., et al., "JVET Common Test Conditions and Evaluation Procedures for Neural Network-based Video Coding Technology", JVET-Z2016-v1, 26. JVET Meeting, Apr. 20-29, 2022, (The Joint Video Experts Team of ISO/IEC JTC1/SC29/WP 3 and ITU-T SG.16), pp. 1-10.

Bross B., et al., "Versatile Video Coding (Draft 10)", 19. JVET Meeting, Jun. 22, 2020-Jul. 1, 2020, Teleconference, (The Joint Video Experts Team of ISO/IEC JTC1/SC29/WG11 and ITU-T SG.16), No. JVET-S2001vH, Sep. 4, 2020, 551 Pages, XP030289618, Sections 7.3.2.4 and 7.4.3.4.

Eadie S., et al., "EE1-1.7: Capacity Ablation of CNN-Based In-loop Filtering", JVET-AB0164-v1, 28. JVET Meeting, Oct. 20-28, 2022, (The Joint Video Experts Team of ISO/IEC JTC1/SC29/WP 3 and ITU-T SG.16), pp. 1-9.

Hsu C.W., et al., (MediaTek): "Description of SDR Video Coding Technology Proposal by MediaTek", 10th JVET Meeting, Apr. 10, 2018-Apr. 20, 2018, San Diego, (The Joint Video Exploration Team of ISO/IEC JTC1/SC 29/WG11 and ITU-TSG.16 WP 3), Apr. 3, 2018, XP030151179, 64 Pages, Sections 2.4.1 -2.4.1.3 with Figures 5-8, Paragraphs [2. 8. 4], [2. 8. 5].

International Search Report and Written Opinion—PCT/US2023/024984—ISA/EPO—Aug. 9, 2023 13 pp.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Li J., et al., (Bytedance): "EE1-1.6-Related: ALF With Samples Before Deep In-Loop Filter", JVET-AA0115-v2, 27. JVET Meeting, Jul. 13-22, 2022, Teleconference, (The Joint Video Experts Team of ISO/IEC JTC1/SC29/WP 3 and ITU-T SG.16), Jul. 18, 2022, 8 Pages.

Li J., et al., "EE1-1.6-Related: RDO Considering Deep In-Loop Filter with SADL", JVET-AA0113-v2, 27. JVET Meeting, Jul. 13-22, 2022, Teleconference, (The Joint Video Experts Team of ISO/IEC JTC1/SC29/WP 3 and ITU-T SG.16), 6 Pages.

Li Y., (Bytedance): "EE1-1.6-Related: Deep In-Loop Filter with Additional Input Information", JVET-AA0112-v3, 27. JVET Meeting, Jul. 13-22, 2022, Teleconference, (The Joint Video Experts Team of ISO/IEC JTC1/SC29/WP 3 and ITU-T SG.16), 10 Pages.

Li Y., et al., (Bytedance): "EE1-1.6: Deep In-Loop Filter With Fixed Point Implementation", 27. JVET Meeting, Jul. 13, 2022-Jul. 22, 2022, Teleconference, (The Joint Video Exploration Team of ISO/IEC JTC1/SC29/WG11 and ITU-T SG.16 ), No. JVET-AA0111-V1, m60081, Jul. 7, 2022, 7 Pages, XP030302914, The Whole Document.

Li Y., et al., (Bytedance): "EE1-1.6: Deep In-Loop Filter With Fixed Point Implementation", JVET-AA0111-v4, 27. JVET Meeting, Jul. 13-22, 2022, Teleconference, (The Joint Video Experts Team of ISO/IEC JTC1/SC29/WP 3 and ITU-T SG.16), 7 pages.

Li Y., et al., "EE1-1.7: Combined Test of EE1-1.6 and EE1-1.3", JVET-Z0113-v1, 26. JVET Meeting, Apr. 20-29, 2022, (The Joint Video Experts Team of ISO/IEC JTC1/SC29/WP 3 and ITU-T SG.16), pp. 1-7.

Wang H., et al., "EE1-Related: CNN Based In-loop Filtering with Large Activation Layer", JVET-AA0131-v3, 27. JVET Meeting, Jul. 13-22, 2022, Teleconference, (The Joint Video Experts Team of ISO/IEC JTC1/SC29/WP 3 and ITU-T SG.16), pp. 1-4.

Wang L., et al., "EE1-1.2: Neural Network Based In-loop Filter with a Single Model", JVET-Z0091-v4, 26. JVET Meeting, Apr. 20-29, 2022, Teleconference, (The Joint Video Experts Team of ISO/IEC JTC1/SC29/WP 3 and ITU-T SG.16), pp. 1-11.

Wang L., et al., "EE1-1.5: Neural Network Based In-loop Filter with a Single Model", JVET-AA0088-v5, 27. JVET Meeting, Jul. 13-22, 2022, (The Joint Video Experts Team of ISO/IEC JTC1/SC29/WP 3 and ITU-T SG.16), pp. 1-8.

Wang L., et al., (Tencent): "EE1-1.1-Related: Alternative Filter Designs", 25. JVET Meeting, Jan. 12, 2022-Jan. 21, 2022, Teleconference, (The Joint Video Exploration Team of ISO/IEC JTC1/SC29/WG11 and ITU-T SG. 16 ), No. JVET-Y0080-V3, Jan. 13, 2022, 7 Pages, XP030300310.

Zhou C., et al., "EE1-Related: Deep In-Loop Filter in EE1-1.6 with Adaptive Input Samples", JVET-AA0094-v3, 27. JVET Meeting, Jul. 13-22, 2022, Teleconference, (The Joint Video Experts Team of ISO/IEC JTC1/SC29/WP 3 and ITU-T SG.16), pp. 1-3.

* cited by examiner

350

PREDICT CURRENT BLOCK

352

CALCULATE RESIDUAL BLOCK
FOR CURRENT BLOCK

354

TRANSFORM AND QUANTIZE
RESIDUAL BLOCK

356

SCAN TRANSFORM
COEFFICIENTS OF RESIDUAL
BLOCK

358

ENTROPY ENCODE
TRANSFORM COEFFICIENTS

360

OUTPUT ENTROPY ENCODED
DATA OF BLOCK

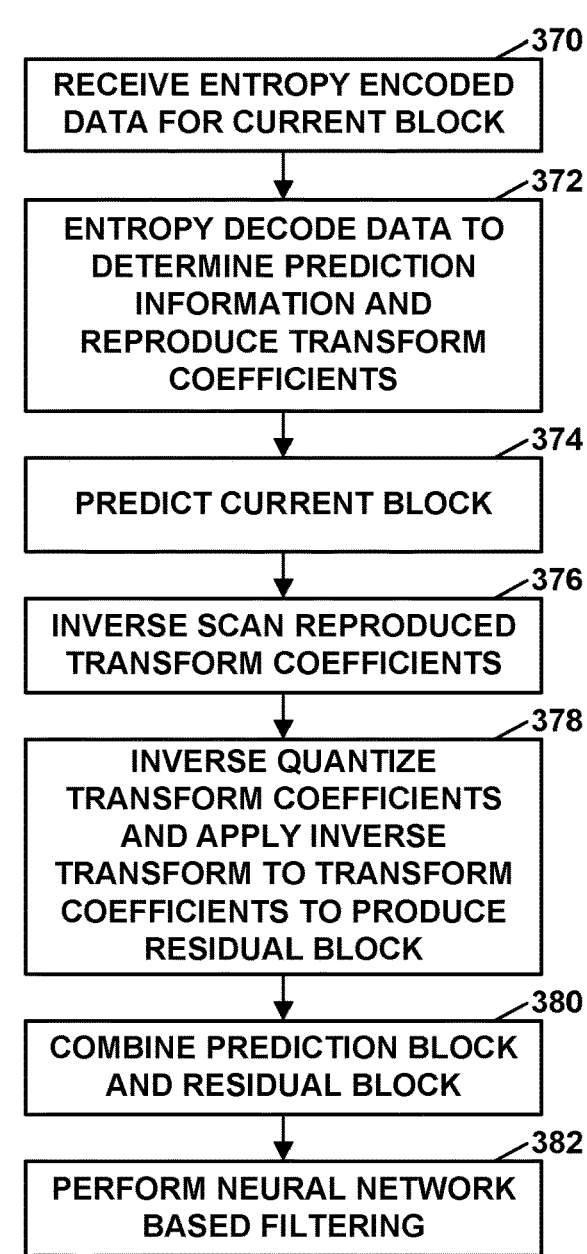

RECEIVE ENTROPY ENCODED
DATA FOR CURRENT BLOCK
370

ENTROPY DECODE DATA TO
DETERMINE PREDICTION
INFORMATION AND
REPRODUCE TRANSFORM
COEFFICIENTS
372

PREDICT CURRENT BLOCK
374

INVERSE SCAN REPRODUCED
TRANSFORM COEFFICIENTS
376

INVERSE QUANTIZE
TRANSFORM COEFFICIENTS
AND APPLY INVERSE
TRANSFORM TO TRANSFORM
COEFFICIENTS TO PRODUCE
RESIDUAL BLOCK
378

COMBINE PREDICTION BLOCK
AND RESIDUAL BLOCK
380

PERFORM NEURAL NETWORK
BASED FILTERING
382

FIG. 5

NEURAL NETWORK BASED FILTERING PROCESS FOR MULTIPLE COLOR COMPONENTS IN VIDEO CODING

This application claims the benefit of U.S. Provisional Application No. 63/367,713, filed Jul. 5, 2022, the entire contents of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for filtering process of a distorted picture. The filtering process may be based on machine learning techniques, such as neural network technologies. The example techniques may be used in the context of advanced video codecs, such as in accordance with the Versatile Video Coding (VVC) standard, extension of VVC, a next generation of video coding standard, or any other video codecs.

As described in more detail, this disclosure describes examples of neural network based filtering in which color components (e.g., chroma components) of video data share the same neural network mode. For instance, rather than a video encoder and a video decoder selecting a different neural network modes for the two chroma components, the video encoder and video decoder may select the same neural network mode for the two chroma components. In this manner, there may be reduction in complexity and processing time because the video encoder and video decoder may perform the filtering selection and/or filtering execution fewer times as compared to where different neural network modes for the two chroma components can be selected.

In one example, the disclosure describes a method of processing video data, the method comprising: receiving a syntax element that defines a filtering mode for a neural network (NN) model for both a first color component and a second color component; applying an instance of the NN model, in the defined filtering mode, to a first block of the first color component to generate a first filtered block; and storing the first filtered block for a coding unit (CU).

In one example, the disclosure describes a device for processing video data, the device comprising: memory configured to store the video data; and one or more processors implement in circuitry, coupled to the memory, and configured to: receive a syntax element that defines a filtering mode for a neural network (NN) model for both a first color component and a second color component; apply an instance of the NN model, in the defined filtering mode, to a first block of the first color component to generate a first filtered block; and store, in the memory, the first filtered block for a coding unit (CU).

In one example, the disclosure describes a computer-readable storage medium storing instructions thereon that when executed cause one or more processors to: receive a syntax element that defines a filtering mode for a neural network (NN) model for both a first color component and a second color component; apply an instance of the NN model, in the defined filtering mode, to a first block of the first color component to generate a first filtered block; and store the first filtered block for a coding unit (CU).

The details of one or more examples are set forth in the accompanying drawings and the description below. Other features, objects, and advantages will be apparent from the description, drawings, and claims.

BRIEF DESCRIPTION OF DRAWINGS

FIG. 5 is a flowchart illustrating an example method for decoding a current block in accordance with the techniques of this disclosure.

DETAILED DESCRIPTION

Figure 1:
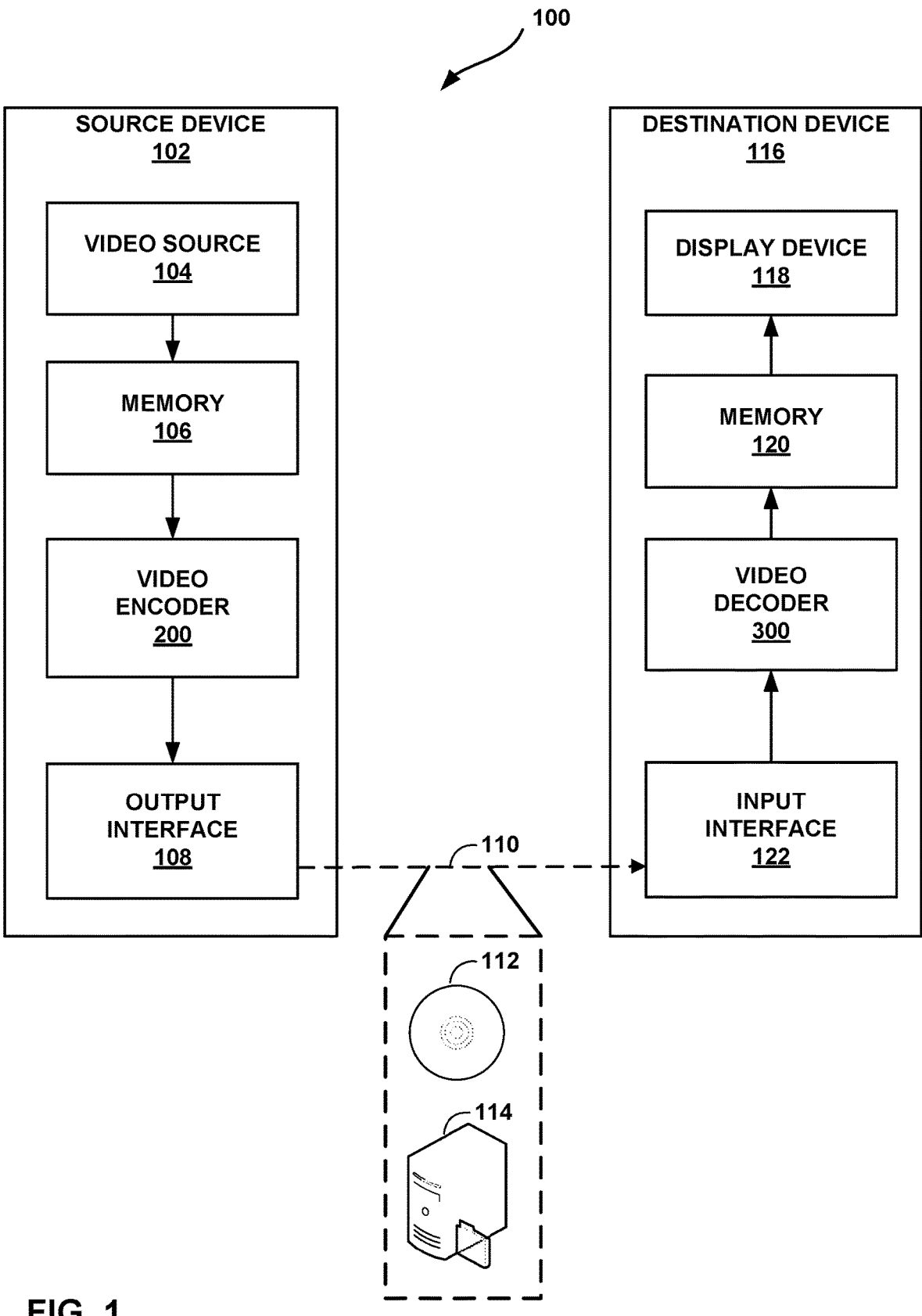
FIG. 1 is a block diagram illustrating an example video encoding and decoding system that may perform the techniques of this disclosure.

Video coding techniques include filtering to reduce coding artifacts. In some examples, the filtering techniques may be machine learning based filtering techniques. For example, the machine learning techniques may be performed with a neural network. For instance, in neural network (NN)-based filtering, reconstructed samples are inputs, and intermediate outputs are residual samples that are added back to the input to refine the input samples.

Video data may include multiple color components, such as red-green-blue (RGB) or luma and two chroma components (YCbCr), etc. In some cases, there may be a different NN-based filter for each of the color components. However, having different NN-based filters for each of the color components may be computational and processing time intensive.

In some cases, it may be possible to utilize a single neural network model, with different NN model modes. That is, in these cases, a first filtering mode for a NN model is used to filter a first color component, and a second filtering mode for the NN model is used to filter a second color component. A video encoder and/or a video decoder may select different modes for each of the two chroma components, which may require execution of filtering twice at the decoder side. For instance, in such examples, the video encoder and video decoder may execute the NN model in the first filtering mode to filter a first block of the first color component, and then execute the NN model for the second time in the second filtering mode to filter a second block of the second color component. Such dual execution of NN model for filtering may be computational intensive.

In accordance with one or more examples described in this disclosure, because of similarity between different color components (e.g., similarly between the two chroma components), the video encoder and the video decoder may utilize a filter control mechanism that makes two or more color components (e.g., that makes the chroma components) share the same neural network mode choice. For example, the video encoder and the video decoder may apply an instance of the NN model, in a defined filtering mode, to a first block of the first color component and apply the same instance of the NN model, in the defined filtering mode, to a second block of the second color component. In addition to the chroma components (e.g., the first and second color components), an input to the NN model may be the luma component, but the output of the NN model may be filtered chroma components, but not filtered luma components (although possible to output filtered luma components in some examples)

To ensure that the NN model is applied with the same filtering mode for both the first block of the first color component and the second block of the second color component (e.g., in cases where NN model filtering is enabled for both color components), the video encoder may signal and the video decoder may receive a syntax element that defines a filtering mode for a NN model for both a first color component and a second color component. In this example, the video decoder may set the filtering mode for both the first color component and the second color component to be the same filtering mode.

In this way, the video encoder and the video decoder may generate filtered blocks using one execution instance of the NN model. With the example techniques described in this disclosure, there may be a reduction in the computation complexity, and possibly without reduction in rate-distortion performance, as compared to techniques in which different neural network modes are possible for different chroma components.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for machine learning (e.g., neural network) based filtering process for multiple color components in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for machine learning (e.g., neural network) based filtering process for multiple color components in video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use filtering, such as machine learning (e.g., neural network) based filtering of video data.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As mentioned above, video coding standards include ITU-T H.261, ISO/IEC MPEG-1 Visual, ITU-T H.262 or ISO/IEC MPEG-2 Visual, ITU-T H.263, ISO/IEC MPEG-4

Visual and ITU-T H.264 (also known as ISO/IEC MPEG-4 AVC), High Efficiency Video Coding (HEVC) or ITU-T H.265, including its range extension, multiview extension (MV-HEVC) and scalable extension (SHVC). The most recent standard Versatile Video Coding (VVC) or ITU-T H.266 has recently been developed by the Joint Video Expert TEAM (JVET) of ITU-T Video Coding Experts Group (VCEG) and ISO/IEC Motion Picture Experts Group (MPEG). The version 1 of VVC specification has been finalized this month and referred as VVC FDIS hereinafter, is available from http://phenix.int-evry.fr/jvet/doc_en-d_user/documents/19_Teleconference/wg11/JVET-S2001-v17.zip.

Figure 2:
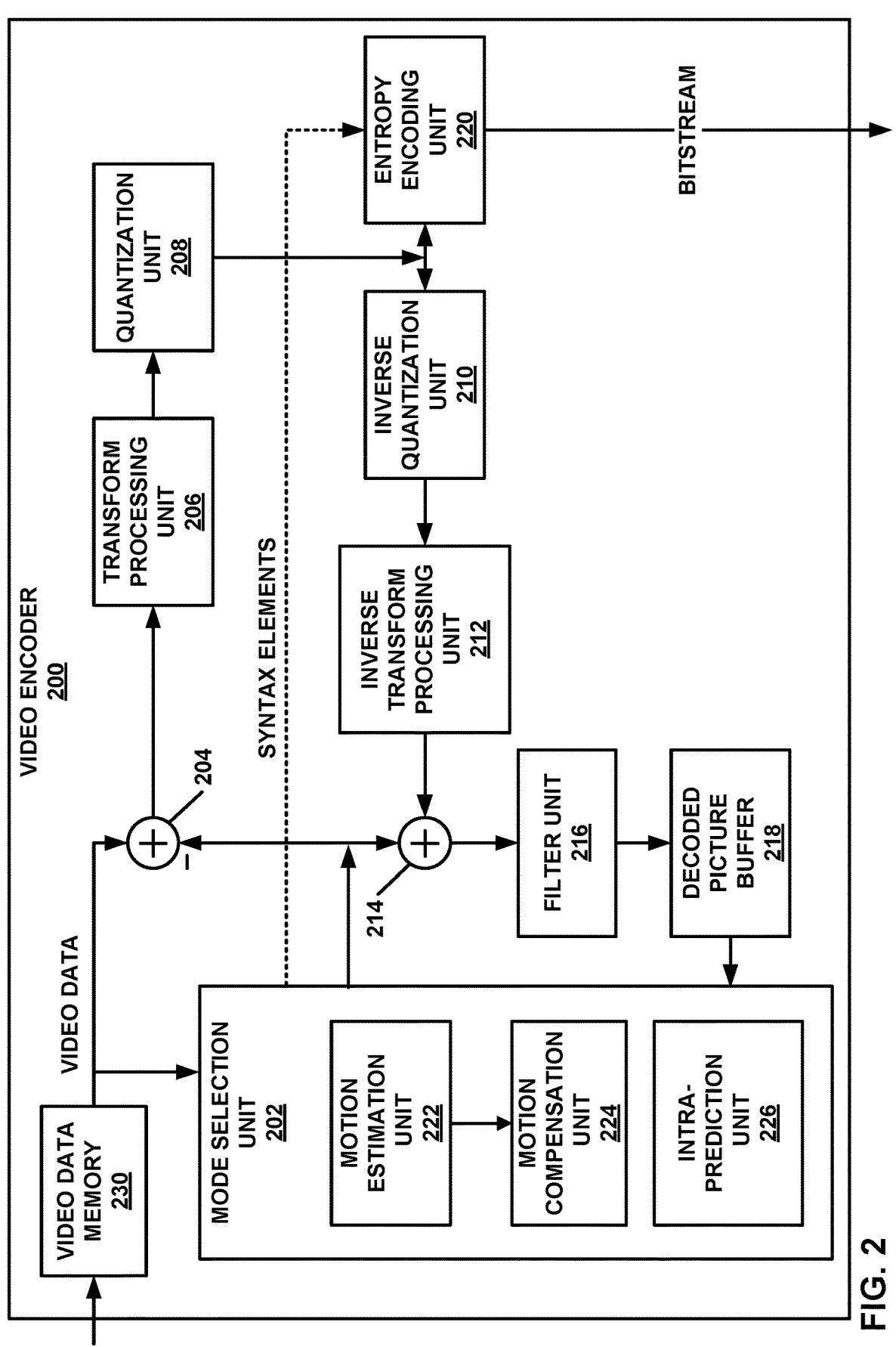
FIG. 2 is a block diagram illustrating an example video encoder that may perform the techniques of this disclosure.
Figure 6:
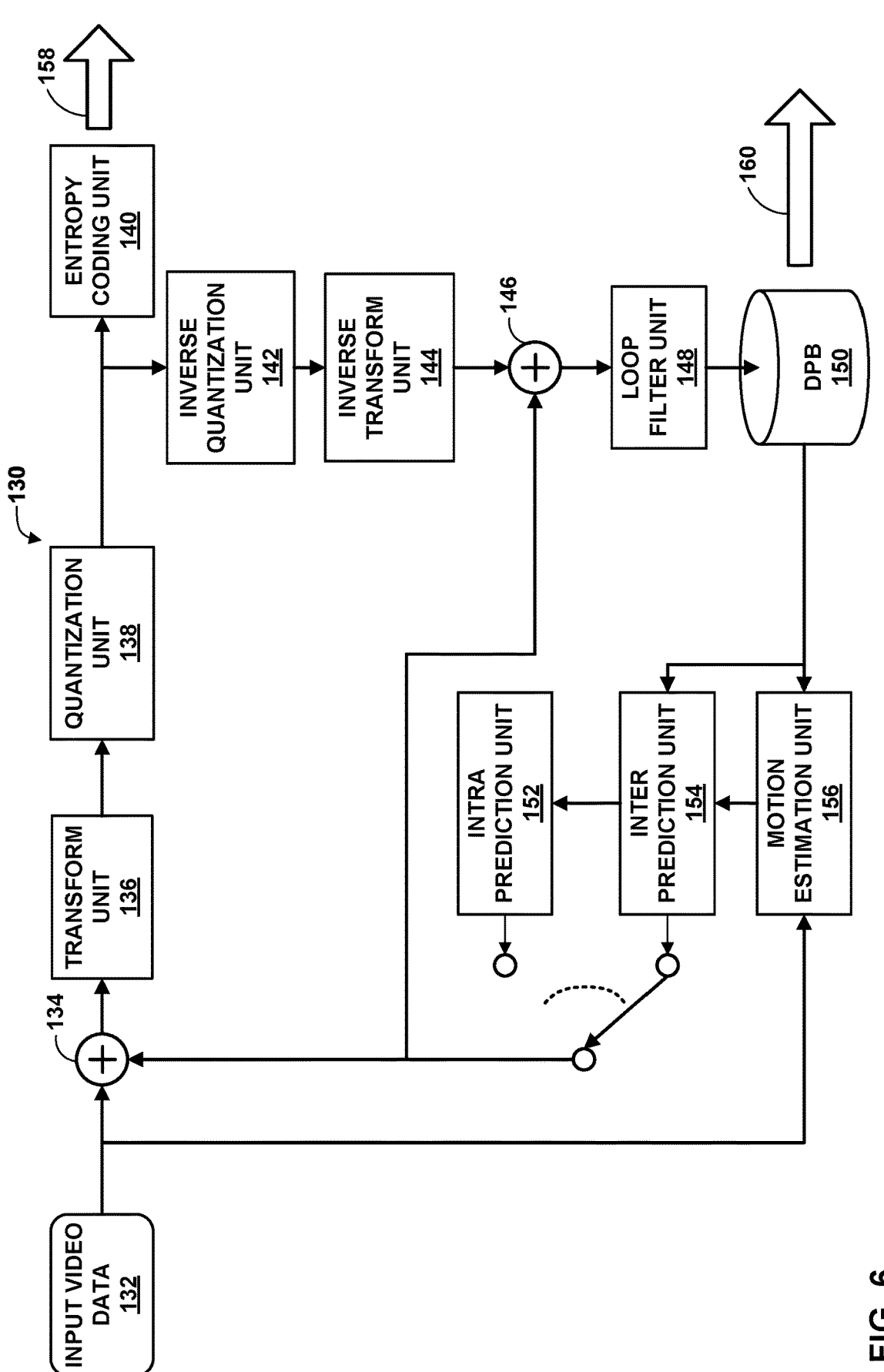
FIG. 6 is a flow diagram illustrating an example of a hybrid video coding framework similar to FIG. 2.

Video coding standards are based on the so-called hybrid video coding principle, which is illustrated in FIG. 6, and is similar to the description of FIG. 2. The term hybrid refers to the combination of two techniques to reduce redundancy in the video signal, such as prediction and transform coding with quantization of the prediction residual. Whereas prediction and transforms reduce redundancy in the video signal by decorrelation, quantization decreases the data of the transform coefficient representation by reducing their precision, ideally by removing only irrelevant details. This hybrid video coding design principle is also used in the two most recent standards HEVC and VVC. As shown in FIG. 6, and also described in more detail with respect to FIG. 2, a modern hybrid video coder is composed of various processes.

As shown in FIG. 6, a modern hybrid video coder 130 generally performs block partitioning, motion-compensated or inter-picture prediction, intra-picture prediction, transformation, quantization, entropy coding, and post/in-loop filtering. In the example of FIG. 2, video coder 130 includes summation unit 134, transform unit 136, quantization unit 138, entropy coding unit 140, inverse quantization unit 142, inverse transform unit 144, summation unit 146, loop filter unit 148, decoded picture buffer (DPB) 150, intra prediction unit 152, inter-prediction unit 154, and motion estimation unit 156.

In general, video coder 130 may, when encoding video data, receive input video data 132. Block partitioning is used to divide a received picture (image) of the video data into smaller blocks for operation of the prediction and transform processes. Early video coding standards used a fixed block size, typically 16×16 samples. Recent standards, such as HEVC and VVC, employ tree-based partitioning structures to provide flexible partitioning.

Figure 7:
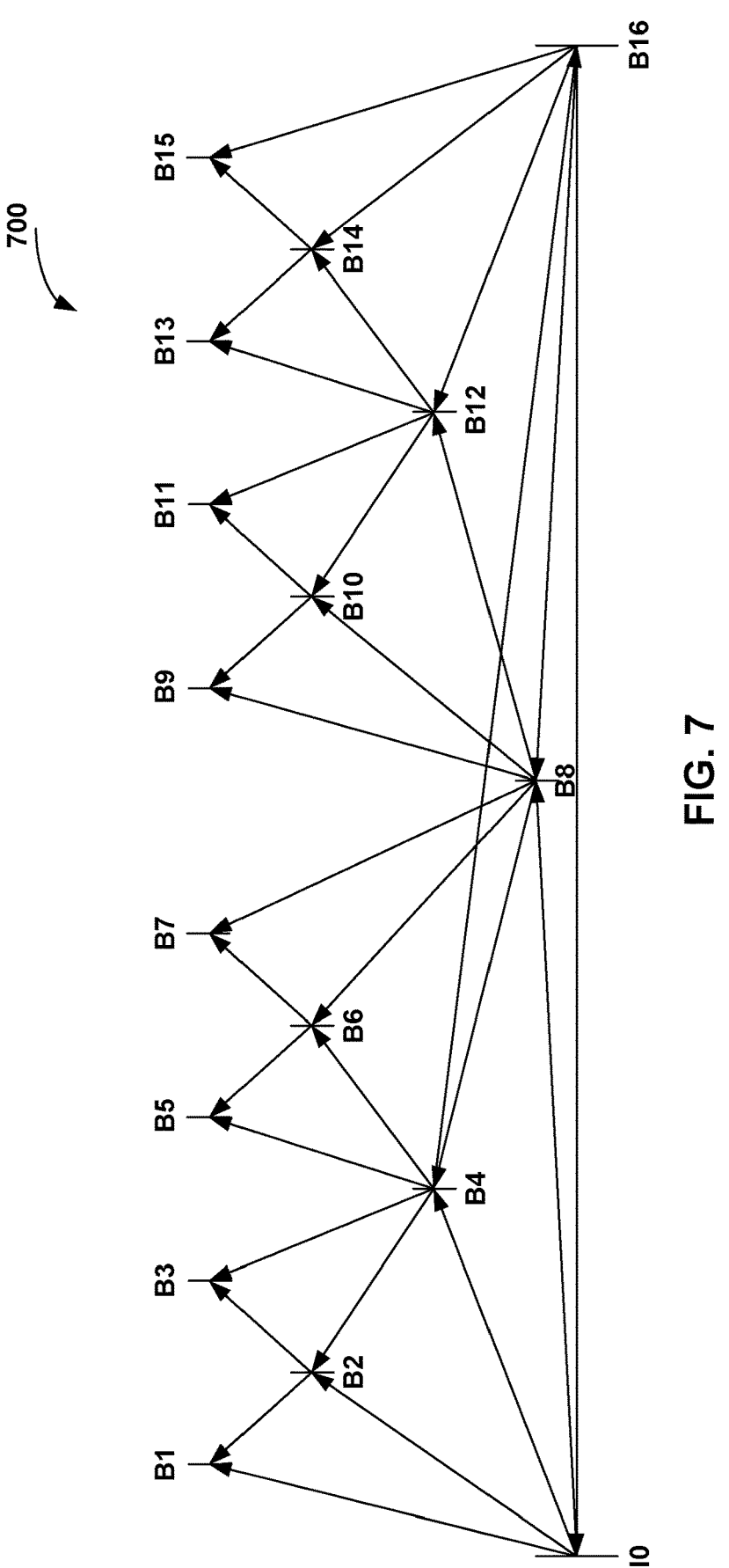
FIG. 7 is a conceptual diagram illustrating an example of a hierarchical prediction structure with group of pictures (GOP) size equal to 16.

Motion estimation unit 156 and inter-prediction unit 154 may predict input video data 132, e.g., from previously decoded data of DPB 150. Motion-compensated or inter-picture prediction takes advantage of the redundancy that exists between (hence "inter") pictures of a video sequence. According to block-based motion compensation, which is used in all the modern video codecs, the prediction is obtained from one or more previously decoded pictures, i.e., the reference picture(s). The corresponding areas to generate the inter-prediction are indicated by motion information, including motion vectors and reference picture indices. In recent video codec, hierarchical prediction structures inside a group of pictures (GOP) is applied to improve coding efficiency. An example of the GOP 700 with size equal to 16 is illustrated in FIG. 7.

Summation unit 134 may calculate residual data as differences between input video data 132 and predicted data from intra prediction unit 152 or inter-prediction unit 154. Summation unit 134 provides residual blocks to transform unit 136, which applies one or more transforms to the residual block to generate transform blocks. Quantization unit 138 quantizes the transform blocks to form quantized transform coefficients. Entropy coding unit 140 entropy encodes the quantized transform coefficients, as well as other syntax elements, such as motion information or intra-prediction information, to generate output bitstream 158.

Meanwhile, inverse quantization unit 142 inverse quantizes the quantized transform coefficients, and inverse transform unit 144 inverse transforms the transform coefficients, to reproduce residual blocks. Summation unit 146 combines the residual blocks with prediction blocks (on a sample-by-sample basis) to produce decoded blocks of video data. Loop filter unit 148 applies one or more filters (e.g., at least one of a neural network-based filter, a neural network-based loop filter, a neural network-based post loop filter, an adaptive in-loop filter, or a pre-defined adaptive in-loop filter) to the decoded block to produce filtered decoded blocks.

In accordance with the techniques of this disclosure, a neural network filtering unit of loop filter unit 148 may receive data for a decoded picture of video data from summation unit 146 and from one or more other units of hybrid video coder 130, e.g., transform unit 136, quantization unit 138, intra prediction unit 152, inter-prediction unit 154, motion estimation unit 156, and/or one or more other filtering units within loop filter unit 148. For example, the neural network filtering unit may receive data from a deblocking filtering unit (also referred to as a "deblocking unit") of loop filter unit 148.

In FIG. 6, intra-picture prediction exploits the spatial redundancy that exists within a picture (hence "intra") by deriving the prediction for a block from already coded/decoded, spatially neighboring (reference) samples. The directional angular prediction, DC prediction and plane or planar prediction are used in the most recent video codec, including AVC, HEVC and VVC.

Transformation: Hybrid video coding standards apply a block transform to the prediction residual (regardless of whether it comes from inter- or intra-picture prediction). In early standard including H.261/262/263, discrete cosine transform (DCT) is employed. In HEVC and VVC, more transform kernel besides DCT is applied in order to account for different statistics in the specific video signal.

Quantization aims to reduce the precision of an input value or a set of input values in order to decrease the amount of data needed to represent the values. In hybrid video coding, the quantization is typically applied to individual transformed residual samples, i.e. to transform coefficients, resulting in integer coefficient levels. In recent video coding standards, the step size is derived from a so-called quantization parameter (QP) that controls the fidelity and bit rate. A larger step size lowers the bit rate but also deteriorates the quality, which e.g. results in video pictures exhibiting blocking artifacts and blurred details.

Entropy Coding: Context-adaptive binary arithmetic coding (CABAC) is used in recent video codec, e.g. AVC, HEVC and VVC, due to its high efficiency.

Post/In-Loop Filtering is a filtering process (or combination of such processes) that is applied to the reconstructed picture to reduce the coding artifacts. The input of the filtering process is generally the reconstructed picture, which is the combination of the reconstructed residual signal (which includes quantization error) and the prediction. That is, the input to the filtering process is a result of adding the prediction to the residual signal. As shown in FIG. 6, the reconstructed pictures after in-loop filtering are stored and used as a reference for inter-picture prediction of subsequent pictures. The coding artifacts are mostly determined by the QP, therefore QP information is generally used in design of the filtering process. In HEVC, the in-loop filters include deblocking filtering and sample adaptive offset (SAO) filtering. In the VVC standard, an adaptive loop filter (ALF) was introduced as a third filter. The filtering process of ALF is as shown below, $$R'(i,j)=R(i,j)+((\Sigma_{k\neq 0}\Sigma_{l\neq 0}f(k,l)\times K(R(i+k,j+1)-R(i,j),c(k,l))+64)>>7) \tag{1}$$

where can R(i, j) is the samples before filtering process, R'(i, j) is the sample value after filtering process. f(k, l) denotes the filter coefficients, K(x, y) is the clipping function and c(k, l) denotes the clipping parameters. The variable k and l varies between $$-\frac{L}{2} \text{ and } \frac{L}{2}$$

where L denotes the filter length. The clipping function K(x, y)=min(y, max(−y, x)) which corresponds to the function Clip3 (−y, y, x). The clipping operation introduces non-linearity to make ALF more efficient by reducing the impact of neighbor sample values that are too different from the current sample value. In VVC, the filtering parameters can be signalled in the bit stream, it can be selected from the pre-defined filter sets. The ALF filtering process can also be summarised as following equation.

$$R'(i,j)=R(i,j)+ALF\_residual\_ouput(R) \tag{2}$$

The following describes neural network (NN) based filtering for video coding. Embedding neural network into hybrid video coding framework may improve compression efficiency. Neural network has been used in the module of intra prediction, inter prediction to improve the prediction efficiency. NN-based in loop filter is also possible. In some examples, the filtering process is applied as post-filter, in this case, the filtering process is only applied to the output picture and the un-filtered picture is used as reference picture.

The NN-based filter can be applied additionally of the existing filters such as deblocking filter, SAO and ALF. It can also be applied exclusively, where it is designed to replace all the existing filters.

Figure 8:
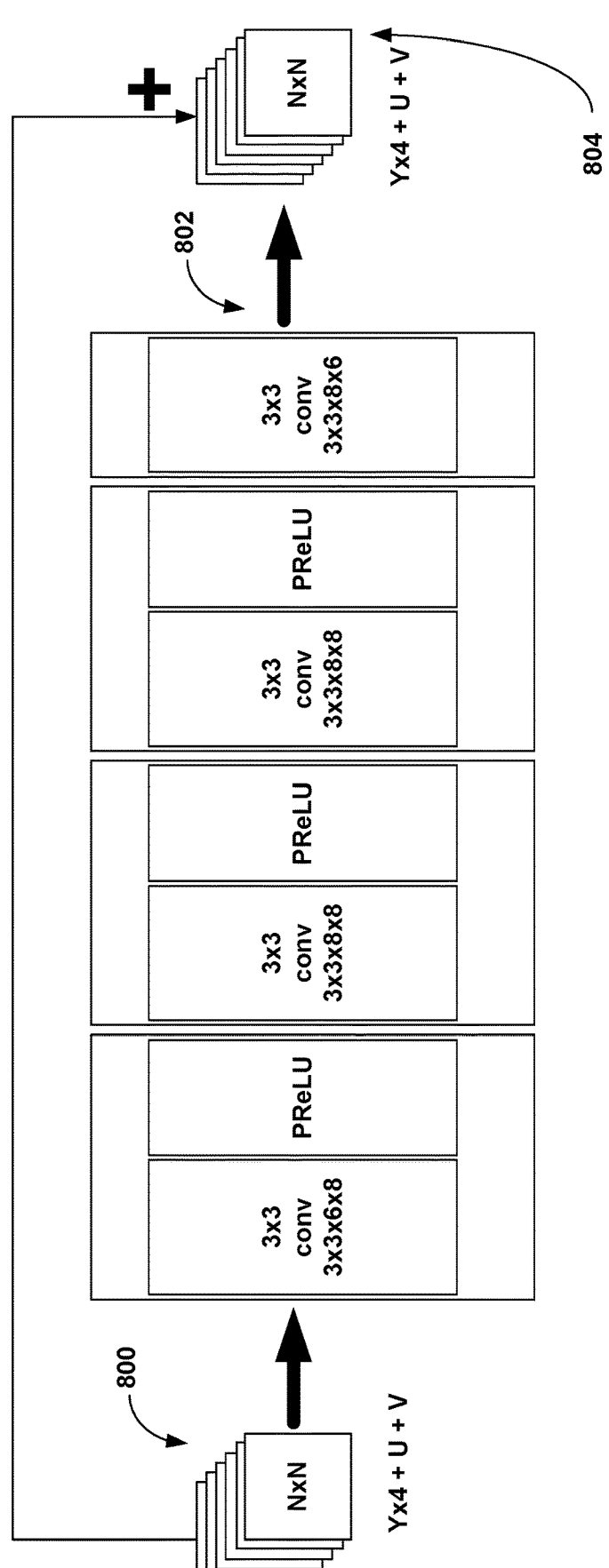
FIG. 8 is a conceptual diagram illustrating an example of a convolutional neural network (CNN).

As shown in FIG. 8, the NN-based filtering process takes the reconstructed samples 800 as inputs, and the intermediate outputs are residual samples (e.g., residual samples 802), which are added back to the input (e.g., reconstructed samples 800) to refine the input samples and generate filtered samples 804. The NN filter may use all color components as input to exploit the cross-component correlations. The different component may share the same filters (including network structure and model parameters) or each component has its own specific filters.

As an example, the NN filter may receive all color components even if a subset of color components is being filtered. For instance, for luma and chroma components, the NN filter may receive a luma block, and both chroma blocks. In this example, assume the Cb chroma block is to be filtered and the luma block or Cr chroma block is not to be filtered. The luma block, Cb chroma block, and Cr chroma block are all inputs to the NN filter. In such examples, the NN filter may generate a filtered Cb chroma block and a filtered Cr chroma block. A filtered luma block may not be generated, but the techniques do not require that the filtered luma block is not generated. However, video encoder 200 and video decoder 300 may discard the filtered Cr chroma block. That is, the reconstructed coding unit (CU) that includes the luma block and the chroma blocks may include the reconstructed luma samples (unfiltered), reconstructed Cr chroma samples (unfiltered), and the filtered reconstructed Cb chroma samples.

The filtering process can also be generalized as follows:

$$R'(i,j)=R(i,j)+NN\_filter\_residual\_ouput(R) \tag{3}$$

The model structure and model parameters of NN-based filter(s) can pre-defined and be stored at video encoder 200 and video decoder 300. The filters can also be signaled in the bitstream.

When NN based filtering is applied in video coding, the whole video signal may be split into multiple processing constituents, and each processing constituent can be processed separately. The possible choices of processing constituents include a frame, a slice/tile, a CTU or any predefined or signaled shapes and sizes. That is, the term "processing constituent" may refer to a portion of a picture or frame on which processing may occur.

The following describes NN based filtering with multi-mode design. To further improve the performance of NN based filtering, multi-mode solutions can be designed. For example, for each processing constituent, video encoder 200 may select among a set of modes based on rate-distortion optimization and the choice can be signaled in the bitstream. The different modes may include different NN models, different values that used as the input information of the NN models, etc. As an example, JVET-Z0113: Y. Li, K. Zhang, L. Zhang, H. Wang, M. Coban, A. M. Kotra, M. Karczewicz, F. Galpin, K. Andersson, J. Ström, D. Liu, R. Sjöberg, EE1-1.7: Combined Test of EE1-1.6 and EE1-1.3, JVET-Z0113, April 2022 (hereinafter JVET-Z0113) proposed a NN based filtering solution that created multiple modes based on a single NN model by using different QP values as input of the NN model for different modes.

There may be certain issues with using NN based filtering techniques. For video signal (e.g., video data) with multiple color components, the filtering process of different color components could be different. However, for certain types of filtering (e.g., neural-network based filtering), applying different filters for each color component could significantly increase the computation complexity and memory requirements. In these cases, better trade-off between compression performance and complexity cost can be achieved by designing filters that can cover multiple color components and applying proper control of the way that these filters are applied in a video codec.

For example, in JVET-Z0113, a NN based filtering solution with multiple modes is proposed which uses different QP values for different modes that video encoder 200 and video decoder 300 may select from for a processing constituent. In such techniques of JVET-Z0113, there is only one model (e.g., only one neural network model) that can be used for the filtering of chroma components of the slice (e.g., where the slice is an example of the processing constituent). The two chroma components can select different modes, which made the inference for the two chroma components require execution of filtering twice at the decoder side.

In some techniques, such as those of JVET-Z0113, if the color components had different modes of the NN filter, video encoder 200 and video decoder 300 would execute two instances of the NN filter in respective different modes. For the different modes, in JVET-Z0113, the inputs are luma and chroma samples, but the output may be only chroma samples for the NN filters meant for filtering chroma components. That is, NN filter modes for chroma components may use luma components as inputs, but not output luma samples. For example, assume that a first NN filter mode is to be applied to a first color component (e.g., Cb) and a second NN filter mode is to be applied to a second color component (e.g., Cr).

In this example, video encoder 200 and video decoder 300 would apply a first instance of the NN filter in the first NN filter mode, with inputs of the luma, Cb, and Cr components (e.g., reconstructed samples of luma, Cb, and Cr blocks). Video encoder 200 and video decoder 300 would disregard the filtered Cr samples and maintain the filtered Cb samples.

Next or in parallel, video encoder 200 and video decoder 300 would apply a second instance of the NN filter in the second NN filter mode, with inputs of the luma, Cb, and Cr components (e.g., reconstructed samples of luma, Cb, and Cr blocks). Video encoder 200 and video decoder 300 would disregard the filtered Cb samples and maintain the filtered Cr samples.

In this example, video encoder 200 and video decoder 300 may maintain the filtered Cb samples from the first instance of the NN filter, maintain the filtered Cr samples from the second instance of the NN filter, and discard the rest. Therefore, in this example, to generate the filtered CU that includes the luma and chroma components, video encoder 200 and video decoder 300 applied two instances of the NN filter, in different modes. Such executing of two instance of the NN filter, in different modes can be processing intensive, and delay the reconstruction of a picture.

The CU is an example of a composite block that includes constituent blocks. For example, the CU includes luma blocks and chroma blocks. In this disclosure, the CU is used as an example to generally mean a composite block that includes different color components, like luma and chroma components. The term CU should not be limited to CUs defined in video coding standards or are part of video codecs unless made clear otherwise.

This disclosure describes example techniques that restrict different modes for different color components. That is, the NN filter mode for one color component is the same filter mode for the other color component. This way, video encoder 200 and video decoder 300 may apply one instance of the NN filter, rather than two instances of the NN filter in different modes.

Furthermore, this disclosure describes example techniques that allow for selectively determining whether to utilize filtered samples from multiple color components or fewer color components (e.g., one color component). In this manner, the use of all filtered components is not necessary, allowing for instances where better coding efficiency or higher image content can be generated from utilizing a subset of filtered components.

Also, as described in more detail, this disclosure describes example techniques of signaling different level parameters for indicating which NN filter mode is to be used. For instance, a slice level syntax element may have a plurality of values. A first value may indicate that NN filtering is disabled for the color components. A subset of values of the plurality of values may each correspond to a different NN filter mode. A last value may indicate that whether NN filtering is enabled or disabled, and the if enabled, the NN filter mode is indicated at a lower level (e.g., at the CTU level for all blocks of a CTU, at the CU level, etc.). In such examples, video encoder 200 may signal and video decoder 300 may receive additional syntax elements for the one or more blocks indicating whether NN filtering is enabled or disabled, and if enabled, the NN filter mode.

In one or more examples described in this disclosure, because of the similarity between the two chroma components, it is possible to design a filter control mechanism that makes chroma components share the same NN mode choice to reduce the computation complexity possibly without sacrificing the rate-distortion performance. That is, this disclosure describes example techniques for filtering process(es) where part of or all the filtering operations (if any) are shared by multiple color components.

The following describes a first implementation of example techniques described in this disclosure. As an implementation, for color formats with one luma component and two chroma components (e.g., YCbCr color format), at most one NN based filter is allowed for each processing constituent to finish the filtering process of the two chroma components.

In a first example, NN filters for chroma color components may be designed to be able to output both filtered chroma components after a single filtering process. The filter control of the two chroma components may be performed jointly. For instance, the two chroma components have exactly the same choice of how NN filter is applied, including on/off switch for NN filtering, how the input data of the NN model is created and the values of all input elements so that the filtered samples of both chroma components can be obtained after a single filtering process.

Similar to JVET-Z0113, for the chroma components, there is one model to be used for the NN filtering, multiple modes are created by using different QP values in the process of creating input of the NN model. The choice of NN filter configuration is signaled and controlled as described below:

At slice level (as an example of a processing constituent, but other examples are possible), a syntax element (referred to as "first level filter mode syntax element") with a value range of [0,4] is signaled for chroma components. The meaning of the 5 syntax values is listed below:

a. 0: the NN filtering of chroma components is turned off for this slice.

b. 1: turn the NN filtering on for the chroma components of this slice, and the first QP in a pre-defined or signaled set is used in the process of creating input of the NN filter.

c. 2: turn the NN filtering on for the chroma components of this slice, and the second QP in a pre-defined or signaled set is used in the process of creating input of the NN filter.

d. 3: turn the NN filtering on for the chroma components of this slice, and the third QP in a pre-defined or signaled set is used in the process of creating input of the NN filter.

e. 4: additional syntax elements are sent to control the NN filtering separately for each processing constituent.

If mode 4 is signaled at slice level, for each processing constituent, an extra syntax element (e.g., "second level filter mode syntax element") with a value range of [0,3] is signaled for the corresponding chroma components. The meaning of the 4 syntax values is listed below:

a. 0: the NN filtering of chroma components is turned off for this processing constituent.

b. 1: turn the NN filtering on for the chroma components of this processing constituent, and the first QP in a pre-defined or signaled set is used in the process of creating input of the NN filter.

c. 2: turn the NN filtering on for the chroma components of this processing constituent, and the second QP in a pre-defined or signaled set is used in the process of creating input of the NN filter.

d. 3: turn the NN filtering on for the chroma components of this processing constituent, and the third QP in a pre-defined or signaled set is used in the process of creating input of the NN filter.

For instance, in the above example, video encoder 200 may signal and video decoder 300 may receive a syntax element (e.g., first level filter mode syntax element) that defines a filtering mode for a neural network (NN) model for both a first color component and a second color component. For example, in the above example, the value of the first level syntax element is in a range of [0,4]. If the value of the first level syntax element is 1, 2, or 3, the first level syntax element defines the filtering mode of the NN model (e.g., NN filter mode) for both the first and second color components. For instance, the value of 1 means the filtering mode is based on first QP in a pre-defined or signaled set, the value of 2 means the filtering mode is based on second QP in the pre-defined or signaled set, and the value of 3 means the filtering mode is based on third QP in the pre-defined or signaled set.

However, if the first level filter mode syntax element has a value of 4, video encoder 200 may signal and video decoder 300 may receive a syntax element (e.g., second level filter mode syntax element) that defines a filtering mode for a neural network (NN) model for both a first color component and a second color component. For example, in the above example, the value of the second level syntax element is in a range of [0,3]. If the value of the first level syntax element is 1, 2, or 3, the second level syntax element defines the filtering mode of the NN model (e.g., NN filter mode) for both the first and second color components. For instance, the value of 1 means the filtering mode is based on first QP in a pre-defined or signaled set, the value of 2 means the filtering mode is based on second QP in the pre-defined or signaled set, and the value of 3 means the filtering mode is based on third QP in the pre-defined or signaled set.

That is, video encoder 200 may signal and video decoder 300 may receive a syntax element that defines a filtering mode for a NN model for both a first color component and a second color component. In one example, the syntax element is the first level filter mode syntax element. In another example, the syntax element is the second level filter mode syntax element. For example, video encoder 200 may signal and video decoder 300 may receive a first syntax element (e.g., first level filter mode syntax element), applicable to a plurality of CUs (e.g., CUs of a slice), indicating that the second syntax element is parsed (e.g., the value of first level filter mode syntax element is 4, and therefore, second level filter mode syntax element is parsed) for a subset of CUs of the plurality of CUs. The subset of CUs includes one or more CUs including the CU that is being reconstructed. That is, the first level filter mode syntax element applies to more CUs than the second level filter mode syntax element.

Video encoder 200 may signal and video decoder 300 may receive the second syntax element based on the first syntax element indicating that the second syntax element is parsed for the subset of CUs. That is, video encoder 200 may signal and video decoder 300 may receive the second level filter mode syntax element for the subset of CUs in a condition where the value for the first level filter mode syntax element is 4.

The example of having a first level filter mode syntax element and a second level filter mode syntax element is provided for purposes of illustration only, and should not be considered limiting. That is, in some examples, there may be one filter mode syntax element that defines a filter mode for CUs. This one filter mode syntax element may be at the picture level (e.g., for all CUs of the picture), at the slice level (e.g., for all CUs of a slice), at the CTU level (e.g., for all CUs of a CTU), or at the CU level (e.g., block-by-block).

Video encoder 200 and video decoder 300 may apply an instance of the NN model, in the defined filtering mode, to a first block of the first color component to generate a first filtered block. For example, the first block may be part of the reconstructed samples 800 of FIG. 8, and first residual values may be values of residual samples 802 of FIG. 8. Video encoder 200 and video decoder 300 may generate a first filtered block (e.g., filtered samples 804 for first color component) based on the first block and the first residual values (e.g., by summing reconstructed samples 800 and residual samples 802).

In one or more examples, because the syntax element (e.g., first level filter mode syntax element or second level filter mode syntax element) defined the filtering mode for the NN model for both the first color component and the second color component, video encoder 200 and video decoder 300 may apply the same instance of the NN model, in the defined filtering mode, to a second block of the second color component to generate a second filtered block residual values. For example, video encoder 200 and video decoder 300 may apply the same instance of the NN model, in the defined filtering mode, to the second block of the second color component to generate second residual values. Video encoder 200 and video decoder 300 may generate the second filtered block based on the second block and the second residual values (e.g., add the second block and the second residual values).

In this disclosure, unless stated otherwise, applying the same instance of the NN model means that one execution of the NN model resulted in the filtered samples for multiple color components. For instance, the NN filter may receive the luma samples, the Cb samples, and the Cr samples as input. The NN filter mode may be defined by the syntax element (e.g., value of 1, 2, or 3 for the first level filter mode syntax element or for the second level filter mode syntax element). Video encoder 200 and video decoder 300 may apply an instance of the NN filter in the defined filter mode, and the output may be filtered Cb samples and filtered Cr samples.

To describe that the filtered Cb samples and the filtered Cr samples are generated from the applying the same instance of the NN model, this disclosure describes video encoder 200 and video decoder 300 as (1) applying an instance of the NN model, in the defined filtering mode, to a first block of the first color component to generate a first filtered block (e.g., based on the first block and first residual values), and (2) applying the same instance of the NN model, in the defined filtering mode, to a second block of the second color component to generate a second filtered block (e.g., based on the second block and the second residual values). That is, only one instance of the NN model is executed to generate the first filtered block for the first color component and the second filtered block for the second color component.

Accordingly, in this example, one syntax element (e.g., the first level filter mode syntax element or the second level filter mode syntax element) defines the filtering mode for both of the chroma components. In some other techniques, such as Z-0133, it would be possible for one syntax element to define the filter mode for a first color component, and another syntax element to define the filter mode for a second color component. With the example techniques described in this disclosure, one syntax element defines the filter mode for the NN model for multiple color components.

In the above example, video encoder 200 and video decoder 300 may store sample values for a coding unit (CU) based on the first filtered block and the second filtered block. For instance, video encoder 200 and video decoder 300 may store, in respective buffers, the first filtered block and the second filtered block as part of the CU so that if the CU is utilized for inter-prediction, the first filtered block and the second filtered block are used for inter-prediction. As another example, video decoder 300 may store, in the buffer, first filtered block and the second filtered block as part of the CU so that when the picture that includes the CU is displayed, the image content is generated based on the first filtered block and the second filtered block.

As described above, one syntax element defines a filtering mode for a NN model (e.g., NN filter mode for an NN filter) for both a first color component and a second color component. In some examples, both the first filtered block for the first color component and the second filtered block for the second color component are stored for the CU. However, in some examples, it may be possible to not store both the first filtered block and the second filtered block for the CU.

It should be noted that in some examples, even if one of the first filtered block for the first color component or the second filtered block for the second color component is not stored for the CU, it may be possible that the first filtered block and the second filtered block are generated. For example, assume that filtered Cb component is needed, but filtered Cr component is not needed for the CU. In this example, the NN model may receive both the luma and chroma components, and generate the filtered Cb component and the filtered Cr component. However, video encoder 200 and video decoder 300 may discard the filtered Cr component. To store values for the CU, video encoder 200 and video decoder 300 may store the filtered Cb component and the original (e.g., unfiltered, reconstructed samples) of the Cr component.

The following describes example techniques for selecting which filtered components are used for storing values for the CU. For ease of description, the disclosure describes filter control for switching NN filter on or off. Such disclosure of NN filter being on or off may refer to examples of whether the filtered color component is used or not. It is possible that a filtered color component is still generated, but the filtered color component is discarded in examples where that filtering of that color component is turned off.

The above example in which if filtering is enabled, both the first filtered block for the first color component and the second filtered block for the second color component are stored for the CU, is referred to as a first example technique. That is, in the first example technique, one syntax element defines a filtering mode for the NN model for both the first color component and the second color component. Also, in this first example technique, video encoder 200 and video decoder 300 store the first filtered block for the first color component and the second filtered block for the second color component as the values for the CU. That is, video encoder 200 and video decoder 300 may apply the same instance of the NN model, in the defined filtering mode, to a first block of the first color component and a second block of the second color component to generate the first filtered block and the second filtered block respectively.

For instance, video encoder 200 and video decoder 300 may apply the same instance of the NN model, in the defined filtering mode, to a first block of the first color component and a second block of the second color component to generate first residual values and second result values, respectively. Video encoder 200 and video decoder 300 may generate the first filtered block based on the first block and the first residual values (e.g., by adding them together), and generate the second filtered block based on the second block and the second residual values (e.g., by adding them together).

In a second example, similar to the first example, NN filters for chroma color components are designed to be able to output both chroma components after a single filtering process. The filter control allows the on/off switch of NN filter for the two chroma components to be signaled separately, besides that, if NN filtering is on for the two chroma components, the output of the two chroma components should be produced by a single filtering process. That is, both the filtered chroma blocks may be the output of the NN filter, but at least one of the filtered chroma blocks may be discarded.

At slice level (as an example of a processing constituent), a syntax element with a value range of [0,4] is signaled for the first chroma component (referred to as first_chroma_mode_slice in the following description). For the second chroma component, if the first_chroma_mode_slice==0, another syntax element with a value range of [0,4] is signaled for the second chroma component (referred to as second_chroma_mode_slice in the following description) to indicate the choice of NN filtering for the second chroma component. Otherwise (first_chroma_mode_slice !=0), a flag with a value range of [0,1] is signaled, if the flag is 0, then second_chroma_mode_slice is set 0, otherwise second_chroma_mode_slice is set to first_chroma_mode_slice.

The meaning of the 5 syntax values of first_chroma_mode_slice and second_chroma_mode_slice are the same as that in the first example except that the scope of each mode may be limited to the corresponding chroma component. That is, the value of first_chroma_mode_slice and second_chroma_mode_slice may be the same as the values for the first level filter mode syntax element or the second level filter mode syntax element described above. The logic of decoding/deriving first_chroma_mode_slice and second_chroma_mode_slice can be summarised as the following pseudocode. In the following pseudocode, the syntax elements that coded in bit-streams are written with bold font, and all syntax values are assumed to be 0 before the decoding/deriving logic starts.

```
first_chroma_mode_slice
if (first_chroma_mode_slice == 0)
{
    second_chroma_mode_slice
}
else
{
    second_chroma_flag_slice
    if (second_chroma_flag_slice == 1)
    {
        second_chroma_mode_slice = first_chroma_mode_slice
    }
    else
    {
        second_chroma_mode_slice = 0
    }
}
```

Similar to the first example where there is a first level filter mode syntax element and a second level filter mode syntax element, if first_chroma_mode_slice or second_chroma_mode_slice equals to 4 (e.g., first level filter mode syntax element has value of 4) additional syntax elements (e.g., second level filter mode syntax elements) are signaled for the choice of NN filtering for each processing constituent separately. The logic of decoding/deriving the can be summarised in the below pseudocode. The syntax elements that coded in bit-streams are written with bold font, and all syntax values are assumed to be 0 before the decoding/deriving logic starts.

```
if (first_chroma_mode_slice == 4 || second_chroma_mode_slice == 4)
{
    if(first_chroma_mode_slice == 0)
        first_chroma_mode_processing_unit = 0
    else
        first_chroma_mode_processing_unit
    if (second_chroma_mode_slice == 0)
        second_chroma_mode_processing_unit = 0
    else if (first_chroma_mode_processing_unit != 0)
    {
        second_chroma_flag_processing_unit
        if (second_chroma_flag_processing_unit == 1)
            second_chroma_mode_processing_unit =
first_chroma_mode_processing_unit
        else
            second_chroma_mode_processing_unit = 0
    }
    else
        second_chroma_mode_processing_unit
}
```

In this example, the interpretation of the slice level and processing constituent level mode values are the same as that above for the first level filter mode syntax element and the second level filter mode syntax element. At slice level, 0 means NN filtering is off, 1-3 corresponds to the 3 QP choices that can be used in the process of creating input information for the NN model, and 4 means extra information is signaled at processing constituent level (e.g., at CTB level for all CUs of CTB, at CU level, etc.) to indicate the NN filtering choice of each processing constituent. Similarly, at processing constituent level, 0 means NN filtering is off, 1-3 corresponds to the 3 QP choices that can be used in the process of creating input information for the NN model.

Accordingly, in one or more examples, the syntax element that video encoder 200 signals and video decoder 300 receives may have a value indicating that NN based filtering is enabled for the first color component (e.g., first_chroma_mode_slice is true). In this example, video encoder 200 may signal and video decoder 300 may receive a flag (e.g., second_chroma_flag_slice) indicating that NN based filtering is enabled for the second color component (e.g., second_chroma_flag_slice is true). In this example, video encoder 200 and video decoder 300 may generate a second filtered block based on a second block of the second color component from applying the same instance of the NN model, in the defined filtering mode, to the second block. To store values for the CU, video encoder 200 and video decoder 300 may store values for the CU based on the first filtered block and the second filtered block.

In some examples, it may be possible that the filtered second color component is not used as values for the CU. For example, video encoder 200 may signal and video decoder 300 may receive a flag (e.g., second_chroma_flag_slice) indicating that NN based filtering is disabled for the second color component (e.g., (e.g., second_chroma_flag_slice is false). In this example, video encoder 200 and video decoder 300 may store values for CU based on the first filtered block (e.g., block that is filtered using NN) of the first color component and a second block (e.g., block that is not filtered using NN) of the second color component.

In some examples, the first color component may not be filtered (e.g., first_chroma_mode_slice==0). In this example, video encoder 200 may signal and video decoder 300 may receive another syntax element (e.g., second_chroma_mode_slice) that indicates the filter mode for the second color component. In this example, video encoder 200 and video decoder 300 may store values for CU based on the first block (e.g., block that is not filtered for using NN) for the first color component and a second filtered block of the second color component (e.g., block that is filtered using NN).

In general, for the second example, the first_chroma_mode_slice syntax element may be considered as the syntax element that defines a filtering mode for a neural network (NN) model for both a first color component and a second color component. For instance, if first_chroma_mode_slice syntax element is not 0, then NN filtering is on for the first color component, and second_chroma_flag_slice indicates that filtering is on for second color component, then first_chroma_mode_slice defines what the filtering mode is for both the first color component and the second color component.

Even in examples where second_chroma_flag_slice is false, the first_chroma_mode_slice may be considered as defining the filtering mode for both the first color component and the second color component since no additional syntax elements indicating the filtering mode is needed.

As a third example, the third example is same as the second example, except that an alternative way of decoding/deriving the choice of NN filtering is used. For each color component, a flag that indicates the on/off choice is coded and if at least one of the flags indicates the NN filtering is on, additional syntax element is signaled. The slice level (as an example of the processing constituent, but others are possible) decoding is summarised as follows. The syntax elements that coded in bit-streams are written with bold font, and all syntax values are assumed to be 0 before the decoding/deriving logic starts.

```
first_chroma_flag_slice
second_chroma_flag_slice
if (first_chroma_flag_slice || second_chroma_flag_slice)
{
    chroma_mode_slice
    if(first_chroma_flag_slice == 1)
        first_chroma_mode_slice = chroma_mode_slice + 1
    if(second_chroma_flag_slice == 1)
        second_chroma_mode_slice = chroma_mode_slice + 1
}
```

In this example, first_chroma_flag_slice and second_chroma_flag_slice have the range value of [0,1], and chroma_mode_slice has the range value of [0,3], so the value range of first_chroma_mode_slice and second_chroma_mode_slice is kept the same as that in the second example. The range [0,4], and the interpretation of the values are also aligned. That is, chroma_mode_slice may be considered as an example syntax element that defines a filtering mode for a neural network (NN) model for both a first color component and a second color component. The values for chroma_mode_slice may be the same as the first level filter mode syntax element described above.

For instance, video encoder 200 may signal and video decoder 300 may receive a flag indicating that NN based filtering is enabled for the first color component. In this example, video encoder 200 may signal and video decoder 300 may receive the first_chroma_flag_slice indicating that NN based filtering is enabled for the first color component. Similarly, video encoder 200 may signal and video decoder 300 may receive a flag indicating that NN based filtering is determine the filtering mode based on the value of chroma_mode_slice. As shown above, the equation to determine the filtering mode for both color components is the same (e.g., the filter mode is chroma_mode_slice+1 for both). Therefore, chroma_mode_slice defines the filtering mode for the NN model for both the first color component and the second color component.

Equivalents of this example can be created by modifying the way of deriving and interpreting the syntax elements. An example of such an equivalent design is described in a later example.

In this example, if first_chroma_mode_slice or second_chroma_mode_slice equals to 4, extra syntax elements (e.g., like second level filter mode syntax elements) are signaled for the choice of NN filtering for each processing constituent separately. The logic of decoding/deriving the can be summarised as pseudocode. The syntax elements that coded in bit-streams are written with bold font, and all syntax values are assumed to be 0 before the decoding/deriving logic starts.

```
if (first_chroma_mode_slice == 4 || second_chroma_mode_slice == 4)
{
    if (first_chroma_mode_slice == 0)
        first_chroma_mode_processing_unit = 0
    else
        first_chroma_flag_processing_unit
    if (second_chroma_mode_slice == 0)
        second_chroma_mode_processing_unit = 0
    else
        second_chroma_flag_processing_unit
    if (first_chroma_flag_processing_unit != 0 ||
first_chroma_flag_processing_unit != 0)
        chroma_mode_processing_unit
        if (first_chroma_flag_processing_unit == 1)
            first_chroma_mode_processing_unit =
chroma_mode_processing_unit+1
        else
            first_chroma_mode_processing_unit = 0
        if (second_chroma_flag_processing_unit == 1)
            second_chroma_mode_processing_unit =
chroma_mode_processing_unit + 1
        else
            second_chroma_mode_processing_unit = 0
}
``` enabled for the second color component. In this example, video encoder 200 may signal and video decoder 300 may receive the second_chroma_flag_slice indicating that NN based filtering is enabled for the second color component.

Video encoder 200 may signal and video decoder 300 may receive the syntax element the defines the filtering mode for the NN model for both the first color component and the second color component based on the flag indicating that NN based filtering is enabled for the first color component. For instance, video encoder 200 may signal and video decoder 300 may receive the chroma_mode_slice syntax element based on first_chroma_flag_slice being true. Similarly, video encoder 200 may signal and video decoder 300 may receive the syntax element the defines the filtering mode for the NN model for both the first color component and the second color component based on the flag indicating that NN based filtering is enabled for the second color component. For instance, video encoder 200 may signal and video decoder 300 may receive the chroma_mode_slice syntax element based on second_chroma_flag_slice being true.

If NN filtering is enabled (e.g., on) for one or both of the first and second color components, video decoder 300 may In this example, first_chroma_flag_processing_unit and second_chroma_flag_processing_unit have the range value of [0,1], and chroma_mode_processing_unit has the range value of [0,2], so the value range of first_chroma_mode_processing_unit and second_chroma_mode_processing_unit is kept the same as that in in the second example. The range [0,3], and the interpretation of the values are also aligned. Equivalents of this example can be created by modifying the way of deriving and interpreting the syntax elements. An example of such an equivalent design is described in a later example.

As a fourth example, the fourth example is an equivalent of the third example, the deriving/interpretation of the syntax values are different, but the actual NN control are the same. The slice level decoding can be summarized as follows. The syntax elements that coded in bit-streams are written with bold font, and all syntax values are assumed to be initialized with 0 before the decoding/deriving logic starts.

```
first_chroma_flag_slice
second_chroma_flag_slice
if (first_chroma_flag_slice || second_chroma_flag_slice)
{
    chroma_mode_slice
    if(first_chroma_flag_slice==1)
        first_chroma_mode_slice = chroma_mode_slice
    if(second_chroma_flag_slice==1)
        second_chroma_mode_slice = chroma_mode_slice
}
```

In this case, first_chroma_flag_slice and second_chroma_flag_slice have the range value of [0,1], and chroma_mode_slice has the range value of [0,3]. As a result, the value range of first_chroma_mode_slice and second_chroma_mode_slice became [0,3]. With the following interpretation, this example is equivalent to the third example:

a. If first_chroma_flag_slice==0, then the NN filtering is off for the 1st chroma component.

b. If first_chroma_flag_slice==1, the NN filtering choice is further signaled/derived as follows:

i. If first_chroma_mode_slice==0, the first QP in a pre-defined or signaled set is used in the process of creating input of the NN filter.

ii. If first_chroma_mode_slice==1, the second QP in a pre-defined or signaled set is used in the process of creating input of the NN filter.

iii. If first_chroma_mode_slice==2, the third QP in a pre-defined or signaled set is used in the process of creating input of the NN filter.

iv. If first_chroma_mode_slice==4, additional syntax elements are sent to control the NN filtering separately for each processing constituent.

Similar to the slice level, when the NN filtering choice is signaled at processing constituent level, first_chroma_mode_processing_unit and second_chroma_mode_processing_unit are assigned with chroma_mode_processing_unit when NN filtering is on (as shown in the following pseudocode). The syntax elements that coded in bit-streams are written with bold font, and all syntax values are assumed to be initialized with 0 before the decoding/deriving logic starts.

The interpretation may be same as the slice level except the mode value of 4 may not exist in the processing constituent level:

a. If first_chroma_flag_processing_unit==0, then the NN filtering is off for the 1st chroma component.

b. If first_chroma_flag_processing_unit==1, the NN filtering choice is further signaled/derived as follows:

i. If first_chroma_mode_processing_unit==0, the first QP in a pre-defined or signaled set is used in the process of creating input of the NN filter.

ii. If first_chroma_mode_processing_unit==1, the second QP in a pre-defined or signaled set is used in the process of creating input of the NN filter.

iii. If first_chroma_mode_processing_unit==2, the third QP in a pre-defined or signaled set is used in the process of creating input of the NN filter.

The first through fourth examples can be extended to any multi-mode NN filtering design and the example techniques described in this disclosure may still apply. For instance, in one or more examples, the syntax element, that defines a filtering mode for the NN model for both the first color component and the second color component, defines which parameter to select from a plurality of parameters, and the defined parameter defines the filtering mode. That is, the syntax element defining the filtering mode may mean the syntax element defines which parameter to use, and the parameter defines the filtering mode.

For example, the syntax element may have a value of 1, 2, or 3, where a value of 1 indicates that a first parameter from a pre-defined set or signaled set defines the filtering mode. The value of 2 indicates that a second parameter from a pre-defined set or signaled set defines the filtering mode, and the value of 3 indicates that a third parameter from a pre-defined set or signaled set defines the filtering mode. In some examples, the parameter is a quantization parameter.

As a few of additional parameters or sets from which the parameter is selected examples:

a. Instead of selecting the QP value from a predefined/signaled set with a size of 3. The method can be extended to the cases of using a candidate set of N values.

b. Instead of using different QP values for different modes, any values that are using in the process of

```
if (first_chroma_mode_slice == 4 || second_chroma_mode_slice == 4)
{
    if (first_chroma_mode_slice == 0)
        first_chroma_mode_processing_unit = 0
    else
        first_chroma_flag_processing_unit
    if (second_chroma_mode_slice == 0)
        second_chroma_mode_processing_unit = 0
    else
        second_chroma_flag_processing_unit
    if (first_chroma_flag_processing_unit != 0 ||
first_chroma_flag_processing_unit != 0)
        chroma_mode_processing_unit
    if (first_chroma_flag_processing_unit)
        first_chroma_mode_processing_unit =
chroma_mode_processing_unit
    else
        first_chroma_mode_processing_unit = 0
    if (second_chroma_flag_processing_unit)
        second_chroma_mode_processing_unit =
chroma_mode_processing_unit
    else
        second_chroma_mode_processing_unit = 0
}
``` creating input to the NN filtering model can be utilized to design multi-mode NN filtering method.

c. Instead of using different QP values for different modes, the multi-mode design can use different NN models for different modes.

d. The different ways of designing multi-mode filtering method described above can be combined to create more sophisticated multi-mode design.

For instance, the techniques may be combined to create M models and for each model, there are N QP values that can be used when creating the input to the model. Then a total number of M*N modes are created. A 4-model design can be created by using two models and two QPs to be selected for each model.

As a second implementation, the example techniques of the first implementation can be extended to cover more color components. For instance, all the examples of the first implementation can be designed in such a way that the NN models are able to output all the three color components (RGB, YUV, etc), and the filter control described in this disclosure can be used to achieve so that at most one NN filtering operation is executed for all the three color components.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters.

Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

In accordance with one or more examples described in this disclosure, filter unit 216 may be configured to perform the neural network based filtering techniques. For instance, filter unit 216 may perform the neural network based filtering techniques in addition to or instead of other filtering techniques such as ALF and SAO. For instance, filter unit 216 may be part of a reconstruction loop that includes a decoding process that video encoder 200 performs. Filter unit 216 may perform the neural network based filtering described in this disclosure as part of in-loop filtering in the reconstruction loop of the decoding process of video encoder 200.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to filter, utilizing a neural network (NN) based filter from a single NN model, two or more color components of the video data, and output, utilizing the NN based filter, the two or more color components after a single filtering process. In some examples, the filtering includes determining how to apply the NN based filter, whether to switch the NN based filter on or off, how input data for the single NN model is created, and values of all input elements in a same manner for the two or more color components.

In some examples, video encoder 200 may be configured to signal information indicative of whether the NN based filter is on or off for each of the two or more color components. In such examples, filtering includes filtering based on whether the NN based filter is one or off for each of the two or more color components.

For example, video encoder 200 may signal a syntax element that defines a filtering mode for a neural network (NN) model for both a first color component and a second color component. Examples of the syntax element include a first level filter mode syntax element, a second level filter mode syntax element, first_chroma_mode_slice (e.g., where first_chroma_mode_slice is not zero, and second_chroma_ flag_slice is true), and chroma_mode_slice (e.g., where first_chroma_flag_slice and/or second_chroma_flag_slice is true), described above.

Filter unit 216 may be configured to apply an instance of the NN model, in the defined filtering mode, to a first block of the first color component to generate a first filtered block. For example, filtering unit 216 may use the reconstructed samples of the first color component (e.g., first chroma block) to generate first residual samples, and add the first residual samples to the reconstructed samples of the first color component to generate the first filtered block.

Filter unit 216 may be configured to apply the same instance of the NN model, in the defined filtering mode, to a second block of the second color component to generate a second filtered block. For example, filtering unit 216 may use the reconstructed samples of the second color component (e.g., second chroma block) to generate second residual samples, and add the second residual samples to the reconstructed samples of the second color component to generate the second filtered block.

In one or more examples, filter unit 216 may store the first filtered block and the second filtered block. For example, the sample values that filter unit 216 stores in DPB 218 for a CU may be first filtered block and the second filtered block. This way, the filtered blocks will be used for inter-prediction if the CU is used for inter-prediction.

In some cases, filter unit 216 may store the second filtered block only if filtering is enabled for the second color component. For example, with the same (e.g., single) instance of the NN model, filter unit 216 may generate the first filtered block and the second filtered block. However, there may be times when the second filtered block is not stored (e.g., discarded).

As an example, video encoder 200 may signal the second_chroma_flag_slice flag, described above, as true indicating that NN based filtering is enabled for the second color component. In this example, filter unit 216 may store values for the CU based on the first filtered block (for the first color component) and the second filtered block (for the second color component). In another example, video encoder 200 may signal the second_chroma_flag_slice flag, described above, as false indicating that NN based filtering is disabled for the second color component. In this example, filter unit 216 may store values for the CU based on the first filtered block (for the first color component) and the second block (for the second color component) without filtering. Again, it is possible that the second filtered block is generated from applying the instance of the NN model; however, this second filtered block may be discarded when second_chroma_ flag_slice flag is false.

Figure 3:
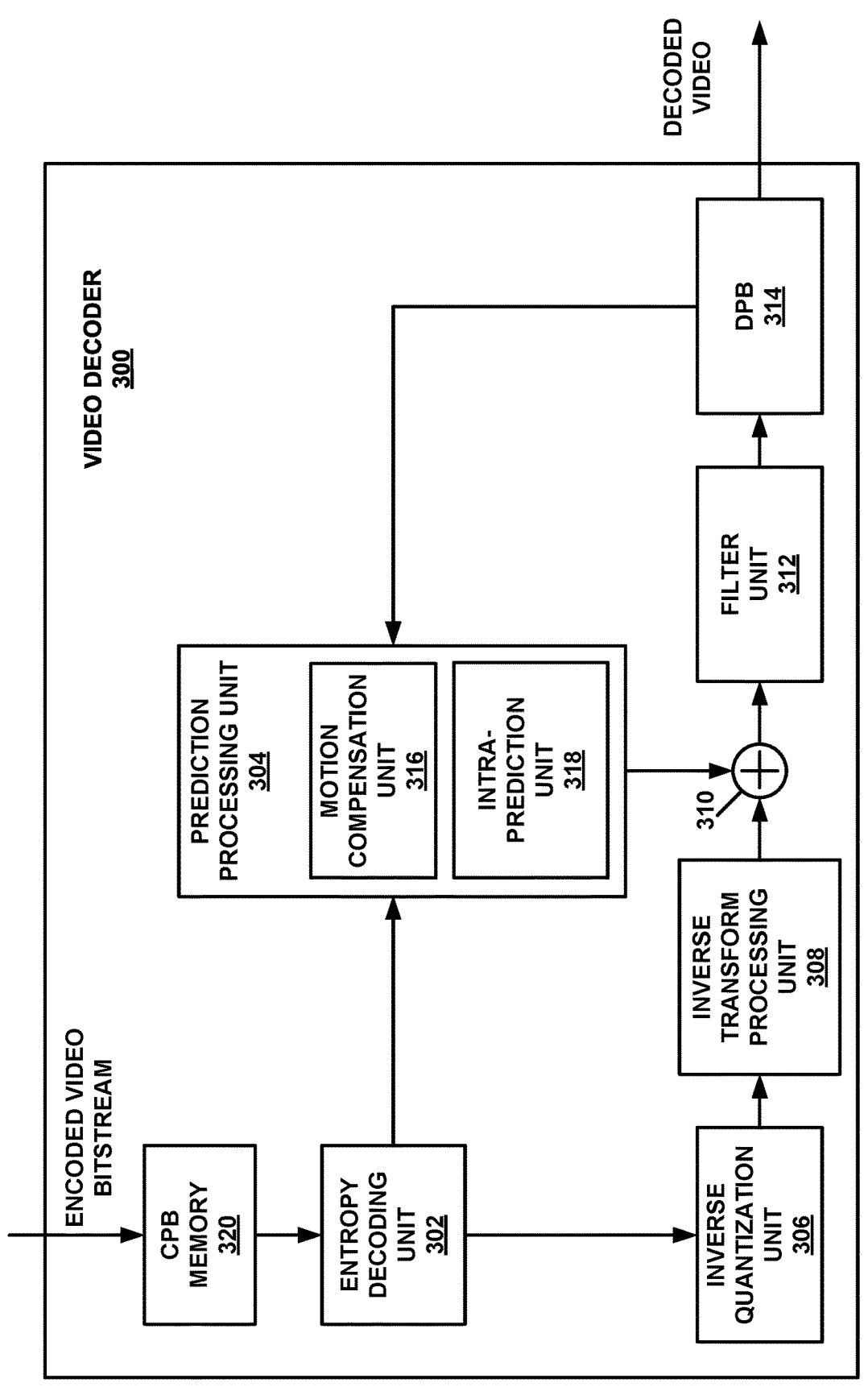
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

In accordance with one or more examples described in this disclosure, filter unit 312 may be configured to perform the neural network based filtering techniques. For instance, filter unit 312 may perform the neural network based filtering techniques in addition to or instead of other filtering techniques such as ALF and SAO. In some examples, filter unit 312 may perform the neural network based filtering described in this disclosure as part of in-loop filtering. Although not illustrated, in some examples, a filter unit may be coupled to the output of DPB 314, and the output from this filter unit may be the decoded video. In some examples, the filter unit coupled to the output of DPB 314 may be configured to perform the example neural network based filtering techniques described in this disclosure as part of post-loop filtering.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to filter, utilizing a neural network (NN) based filter from a single NN model, two or more color components of the video data, and output, utilizing the NN based filter, the two or more color components after a single filtering process. In some examples, the filtering includes determining how to apply the NN based filter, whether to switch the NN based filter on or off, how input data for the single NN model is created, and values of all input elements in a same manner for the two or more color components.

In some examples, video decoder 300 may be configured to receive information indicative of whether the NN based filter is on or off for each of the two or more color components. In such examples, filtering includes filtering based on whether the NN based filter is one or off for each of the two or more color components.

For example, filter unit 312 may receive a syntax element that defines a filtering mode for a neural network (NN) model for both a first color component and a second color component. Examples of the syntax element include a first level filter mode syntax element, a second level filter mode syntax element, first_chroma_mode_slice (e.g., where first_chroma_mode_slice is not zero, and second_chroma_flag_slice is true), and chroma_mode_slice (e.g., where first_chroma_flag_slice and/or second_chroma_flag_slice is true), described above.

In some examples, the syntax element defines which parameter to select from a plurality of parameters, and the defined parameter defines the filtering mode. As one example, the parameter is a quantization parameter, and the plurality of parameters are one of a pre-defined set or a signaled set. For instance, the value of 1 for the first filter mode syntax element indicates that filtering mode is defined by the first parameter in a pre-defined set or a signaled set, the value of 2 for the first level filter mode syntax element indicates that filtering mode is defined by the second parameter in a pre-defined set or a signaled set, and the value of 3 for the first level filter mode syntax element indicates that filtering mode is defined by the third parameter in a pre-defined set or a signaled set. The values for second level filter mode syntax element, first_chroma_mode_slice, and chroma_mode_slice may similarly define the filtering mode, as described in the examples above.

Filter unit 312 may apply an instance of the NN model, in the defined filtering mode, to a first block of the first color component to generate a first filtered block. Also, filter unit 312 may apply the same instance of the NN model, in the defined filtering mode, to a second block of the second color component to generate a second filtered block. Filter unit 312 may store values for a CU based on the first filtered block. In instances where NN based filtering is enabled for both the first color component and the second color component, filter unit 312 may store values for the CU based on the first filtered block and the second filtered block. As described above, CU is used as a term to describe a composite block that includes multiple different color components.

In this way, one syntax element defines the filtering mode for two or more color components, rather than having syntax elements define the filtering mode for each of the color components separately. For example, in execution of the NN model, in the defined filtering mode, filter unit 312 may generate a first filtered block for the first color component and a second filtered block for the second color component. Filter unit 312 may store values for the CU based on the first filtered block, and if filtering is enabled for the second color component, store values for the CU based on the first filtered block and the second filtered block.

Storing values for the CU based on the first filtered block and/or the second filtered block may mean that the samples stored in DPB 314 for the CU are the first filtered block and the second filtered block, or the first filtered block and the second block (without filtering) if filtering is not enabled for the second color component. As another example, the decoded video data that DPB 314 outputs may include the first filtered block and the second filtered block if filtering is enabled for both, or the first filtered block, and the second block (without filtering) if filtering is not enabled for the second color component.

As one example, the syntax element may be a syntax element that is applicable to a plurality of CUs. For instance, the syntax element may be a first level filter mode syntax element that defines a filtering mode for a plurality of CUs (e.g., CUs within a slice). As another example, the syntax element may be a second level filter mode syntax element that defines a filtering mode for a subset of CUs. For instance, video decoder 300 may receive a first syntax element, applicable to a plurality of CUs, indicating that the second syntax element is parsed for a subset of CUs of the plurality of CUs (e.g., first level filter mode syntax element is 4 in the above examples). In this example, the subset of CUs includes one or more CUs including the CU whose values are stored. Video decoder 300 may receive the second syntax element (e.g., second level filter mode syntax element) based on the first syntax element (e.g., first level filter mode syntax element) indicating that the second syntax element is parsed for the subset of CUs. That is, video decoder 300 may receive the second level syntax element having a value between 0 to 3, when the value for the first level syntax element is 4 in the above examples.

As noted above, whether the second filtered block (e.g., generated from NN based filtering) is used or not may be set based on signaled parameters. For example, the syntax element that video decoder 300 receives that defines the filtering mode for the NN model for both the first color component and the second color component may have a value indicating that NN based filtering is enabled for the first color component. For instance, the value for first_chroma_mode_slice may be non-zero. In this example, if a flag (e.g., second_chroma_flag_slice) indicates that NN based filtering is enabled for the second color component, filter unit 312 may generate the second filtered block based on the second block of the second color component from applying the same instance of the NN model, in the defined filtering mode, to the second block.

That is, the first_chroma_mode_slice value may define the filtering mode for the NN model, and if filtering is enabled for the second color component, the value of first_chroma_mode_slice defines the filtering mode of the NN model for the second color component. Accordingly, in the example, filter unit 312 may utilize both the first filtered block and the second filtered block, generated from applying the same instance of the NN model, in the defined filtering mode, to store values for the CU.

However, in the example where second_chroma_flag_slice is false indicating that NN based filtered is disabled for the second color component, filter unit 312 may store values for the CU based on the first filtered block and a second block of the second color component. That is, filter unit 312 may discard the second filtered block of the second color component, and instead store in DPB 314 the first filtered block and the second block (e.g., with NN filtering).

The use of second_chroma_flag_slice is one example. In some examples, such as where the syntax that defines the filtering mode for both color components is chroma_mode_slice, video decoder 300 may receive a flag indicating that NN based filtering is enabled for the first color component (e.g., receive first_chroma_flag_slice or second_chroma_flag_slice). In such examples, video decoder 300 may receive the syntax element (e.g., chroma_mode_slice) based on the flag indicating that NN based filtering is enabled for the first color component.

Figure 4:
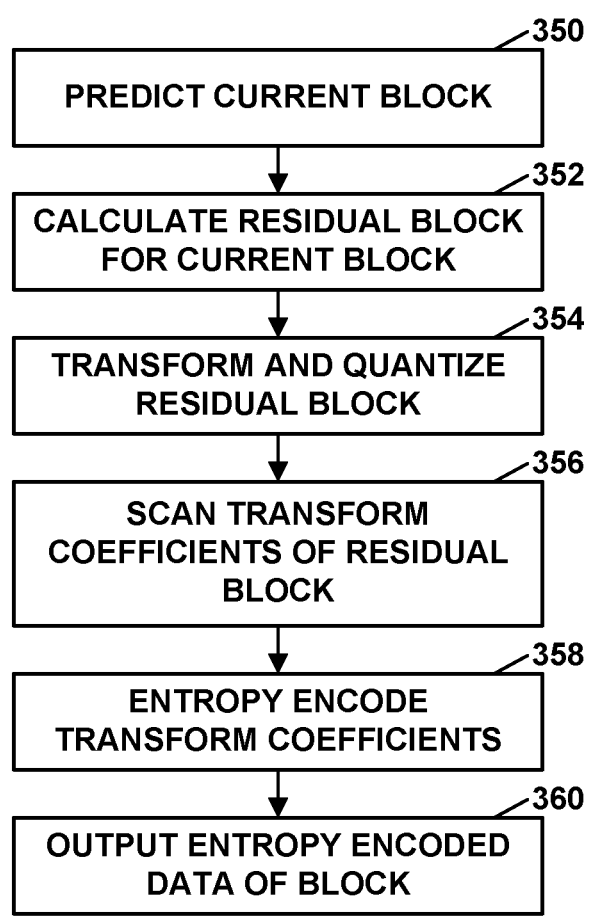
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may comprise a current CU. Although described with respect to video encoder 200 (FIGS. 1 and 2), it should be understood that other devices may be configured to perform a method similar to that of FIG. 4.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

FIG. 5 is a flowchart illustrating an example method for decoding a current block of video data in accordance with the techniques of this disclosure. The current block may comprise a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

In one or more examples, video decoder 300 may also be configured to perform neural network based filtering in accordance with one or more examples described in this disclosure. For instance, filter unit 312 may be configured to perform in-loop filtering using the neural network based filtering. In some examples, a filter unit coupled to the output of DPB 314 may be configured to perform the filtering using the neural network based filtering described in this disclosure as part of post-loop filtering.

Although FIG. 5 is described with respect to video decoder 300, in some examples, video encoder 200 also includes a reconstruction process, and video encoder 200, such as through inverse quantization unit 210, inverse transform processing unit 212, and reconstruction unit 214 may be configured to perform the example techniques of FIG. 5. In some examples, filter unit 216 may be configured to perform the neural network based filtering techniques described in this disclosure. For instance, filter unit 216 may perform in-loop filtering as part of the reconstruction loop of video encoder 200.

Figure 9:
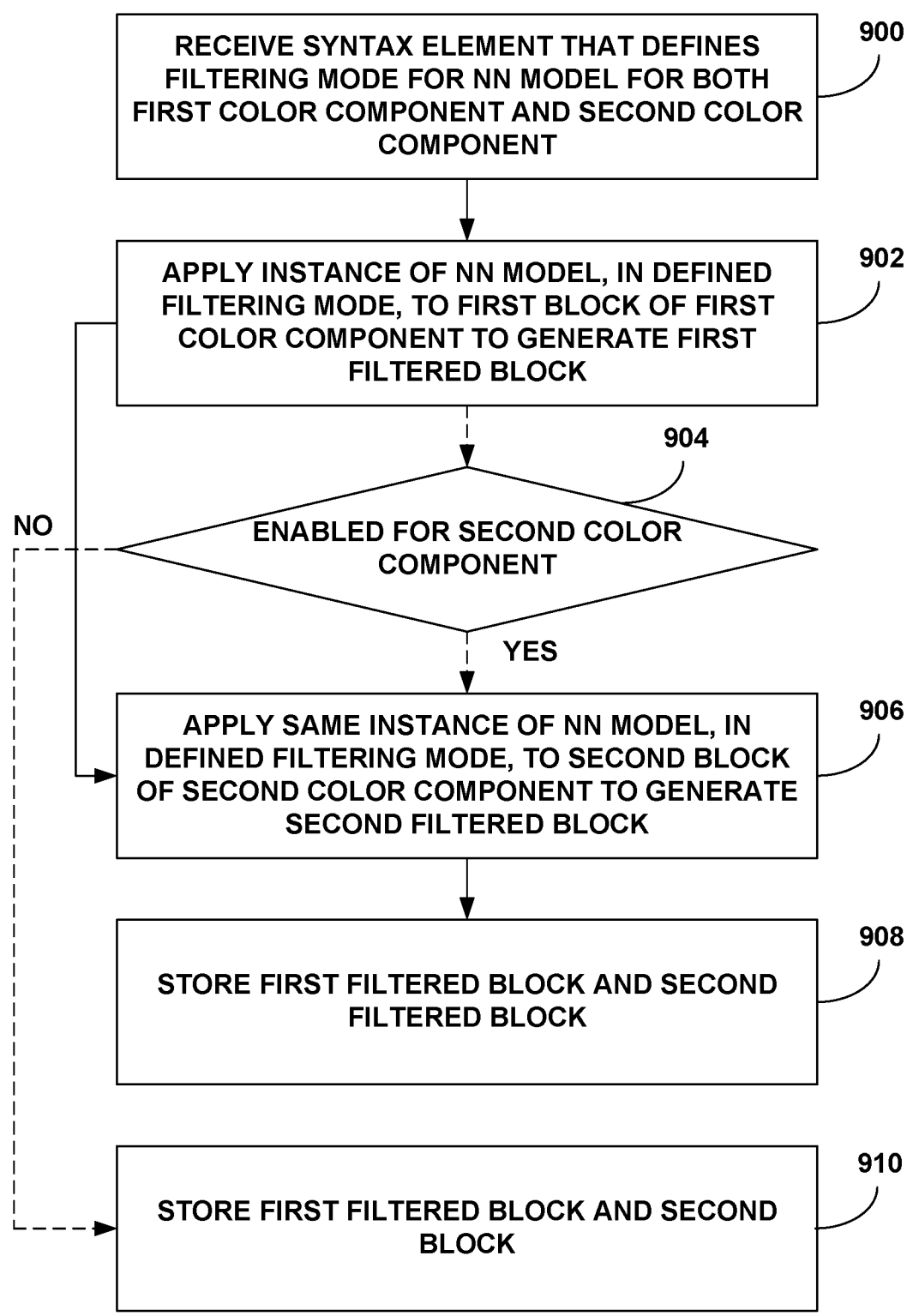
FIG. 9 is a flowchart illustrating an example method of processing video data in accordance with techniques of this disclosure.

FIG. 9 is a flowchart illustrating an example method of processing video data in accordance with techniques of this disclosure. For ease of illustration, the examples are described with respect to video decoder 300, but video encoder 200 may perform similar operations.

Video decoder 300 may receive a syntax element that defines a filtering mode for a neural network (NN) model for both a first color component and a second color component (900). Examples of the syntax element include a first level filter mode syntax element, a second level filter mode syntax element, first_chroma_mode_slice (e.g., where first_chroma_mode_slice is not zero, and second_chroma_flag_slice is true), and chroma_mode_slice (e.g., where first_chroma_flag_slice and/or second_chroma_flag_slice is true), described above. In some examples, the syntax element defines which parameter to select from a plurality of parameters, and the defined parameter defines the filtering mode. As one example, the parameter is a quantization parameter, and the plurality of parameters are one of a pre-defined set or a signaled set.

As described above, the first level filter mode syntax element may have a value between 0 and 4. The value of 0 may indicate that NN based filtering is disabled for color components of blocks within a slice (as one example). The value of 1, 2, or 3 may indicate the filtering mode for the NN model for both the first color component and the second color component (e.g., define whether to use first, second, or third QP from set, and the filtering mode defined by the first, second, or third QP from the set). The value of 4 may indicate that the filtering mode for the NN model is defined at a lower level (e.g., at the CTU level or CU level) by the second level filter mode syntax element. The value of 0 for the second level filter mode syntax element may indicate that NN based filtering is disabled for color components (as one example). The value of 1, 2, or 3 may indicate the filtering mode for the NN model for both the first color component and the second color component (e.g., define whether to use first, second, or third QP from set, and the filtering mode defined by the first, second, or third QP from the set).

The first_chroma_mode_slice is another example of the syntax element that defines a filtering mode for a neural network (NN) model for both a first color component and a second color component. For instance, if first_chroma_mode_slice has a non-zero value, and NN based filtering is enabled for the second color component, then first_chroma_mode_slice defines the filtering mode for both the first color component and the second color component.

The chroma_mode_slice is another example of the syntax element that defines a filtering mode of a neural network (NN) model for both a first color component and a second color component. For example, where first_chroma_flag_slice and/or second_chroma_flag_slice is true, the value of chroma_mode_slice may define the filtering mode (e.g., whether the first, second, or third QP value from the set is used to define the filtering mode).

Filter unit 312 may apply an instance of the NN model, in the defined filtering mode, to a first block of the first color component to generate a first filtered block (902). For example, filter unit 312 may apply the instance of the NN model, in the defined filtering mode, to the first block of the first color component to generate first residual values, and generate the first filtered block based on the first block and the first residual values (e.g., by summing the first residual values and the first filtered block).

In some examples, if NN based filtering is enabled for the first color component, then NN based filtering is automatically enabled for the second color component. That is, in some examples, it may not be possible to selectively not use filtering of the second color component. Accordingly, in one or more examples, filter unit 312 may apply the same instance of the NN model, in the defined filtering mode, to a second block of the second color component to generate a second filtered block (906). As described above, applying the same instance of the NN model may mean that the NN model receives as input both the first block of the first color component and the second block of the second color component (e.g., including luma component), and generates as output the first filtered block of the first color component and the second filtered block of the second color component.

That is, in some examples, the NN model for chroma components (e.g., first color component and second color component) may also receive luma component as an input, but output first filtered block of the first color component and the second filtered block of the second color component. The NN model may not generate a filtered luma block, but in some examples, it may be possible for the NN model to generate the filtered luma block.

In this case, filter unit 312 may store the first filtered block and the second filtered block (908). For example, the sample values that filter unit 312 stores in DPB 314 for the CU may be values of the first filtered block and the second filtered block. However, in some examples, utilizing the second filtered block may not always be true, and may be selectable. For instance, in some examples, filter unit 312 may determine whether NN based filtering for the second color component is enabled (904). For instance, filter unit 312 may determine the value of first_chroma_flag_slice or second_chroma_flag_slice.

For example, the syntax element that defines the filtering mode may be the first_chroma_mode_slice. If the value of first_chroma_mode_slice is non-zero, then filter unit 312 may determine the value of a flag (e.g., second_chroma_flag_slice). That is, filter unit 312 may receive a flag indicating that NN based filtering is enabled for the second color component (YES of 904). In this example, filter unit 312 may apply the same instance of the NN model, in the defined filtering mode, to the second block of the second color component to generate the second filtered block (906), and store the first filtered block and the second filtered block (908).

However, in some examples, filter unit 312 may receive a flag indicating that NN based filtering is disabled for the second color component (NO of 904). In this example, filter unit 312 may store the first filtered block and the second block (e.g., non-NN filtered block) (910).

The following describes example techniques in accordance with one or more examples described in this disclosure.

Clause 1A. A method of processing video data, the method comprising: filtering, utilizing a neural network (NN) based filter from a single NN model, two or more color components of the video data; and outputting, utilizing the single NN based filter, the two or more color components after a single filtering process.

Clause 2A. The method of clause 1A, wherein filtering comprises determining how to apply the NN based filter, whether to switch the NN based filter on or off, how input data for the single NN model is created, and values of all input elements in a same manner for the two or more color components.

Clause 3A. The method of clause 1A, further comprising: receiving or signaling information indicative of whether the NN based filter is on or off for each of the two or more color components, filtering comprises filtering based on whether the NN based filter is one or off for each of the two or more color components.

Clause 4A. The method of any of clauses 1A-3A, further comprising reconstructing sample values of a picture, wherein filtering comprises filtering the two or more color components of the reconstructed sample values of the picture.

Clause 5A. The method of clause 4A, wherein filtering comprises in-loop filtering in a video encoder or a video decoder.

Clause 6A. The method of clause 4A, wherein filtering comprises post-loop filtering in a video decoder.

Clause 7A. A device for processing video data, the device comprising: memory configured to store the video data; and processing circuitry configured to perform the method of any of clauses 1A-6A.

Clause 8A. The device of clause 7A, further comprising a display configured to display decoded video data.

Clause 9A. The device of any of clauses 7A and 8A, wherein the device comprises one or more of a camera, a computer, a mobile device, a broadcast receiver device, or a set-top box.

Clause 10A. The device of any of clauses 7A-9A, wherein the device comprises a video decoder.

Clause 11A. The device of any of clauses 7A-10A, wherein the device comprises a video encoder.

Clause 12A. A computer-readable storage medium having stored thereon instructions that, when executed, cause one or more processors to perform the method of any of clauses 1A-6A.

Clause 13A. A device for processing video data, the device comprising means for performing the method of any of clauses 1A-6A.

Clause 1B. A method of processing video data, the method comprising: receiving a syntax element that defines a filtering mode for a neural network (NN) model for both a first color component and a second color component; applying an instance of the NN model, in the defined filtering mode, to a first block of the first color component to generate a first filtered block; and storing the first filtered block for a coding unit (CU).

Clause 2B. The method of clause 1B, further comprising: applying the same instance of the NN model, in the defined filtering mode, to a second block of the second color component to generate a second filtered block, wherein storing comprises storing the first filtered block and the second filtered block for the CU.

Clause 3B. The method of any of clauses 1B and 2B, wherein receiving the syntax element comprises receiving the syntax element that is applicable to a plurality of CUs, wherein the CU is one of the plurality of CUs.

Clause 4B. The method of any of clauses 1B-3B, wherein the syntax element is a second syntax element, the method further comprising: receiving a first syntax element, applicable to a plurality of CUs, indicating that the second syntax element is parsed for a subset of CUs of the plurality of CUs, wherein the subset of CUs includes one or more CUs including the CU, wherein receiving the syntax element comprises receiving the second syntax element based on the first syntax element indicating that the second syntax element is parsed for the subset of CUs.

Clause 5B. The method of any of clauses 1B-4B, wherein the syntax element has a value indicating that NN based filtering is enabled for the first color component.

Clause 6B. The method of clause 5B, further comprising: receiving a flag indicating that NN based filtering is enabled for the second color component; and generating a second filtered block based on a second block of the second color component from applying the same instance of the NN model, in the defined filtering mode, to the second block, wherein storing comprises storing the first filtered block and the second filtered block for the CU.

Clause 7B. The method of clause 5B, further comprising: receiving a flag indicating that NN based filtering is disabled for the second color component, wherein storing comprises storing the first filtered block and a second block of the second color component for the CU.

Clause 8B. The method of any of clauses 1B-7B, further comprising: receiving a flag indicating that NN based filtering is enabled for the first color component, wherein receiving the syntax element comprises receiving the syntax element based on the flag indicating that NN based filtering is enabled for the first color component.

Clause 9B. The method of any of clauses 1B-8B, wherein the syntax element defines which parameter to select from a plurality of parameters, and wherein the defined parameter defines the filtering mode.

Clause 10B. The method of clause 9B, wherein the parameter is a quantization parameter, and the plurality of parameters are one of a pre-defined set or a signaled set.

Clause 11B. The method of any of clauses 1B-10B, wherein the first color component is a first chroma component, and the second color component is a second chroma component.

Clause 12B. The method of any of clauses 1B-11B, wherein applying the instance of the NN mode, in the defined filtering mode, to the first block of the first color component to generate the first filtered block comprises: applying the instance of the NN model, in the defined filtering mode, to the first block of the first color component to generate first residual values; and generating the first filtered block based on the first block and the first residual values.

Clause 13B. A device for processing video data, the device comprising: memory configured to store the video data; and one or more processors implement in circuitry, coupled to the memory, and configured to: receive a syntax element that defines a filtering mode for a neural network (NN) model for both a first color component and a second color component; apply an instance of the NN model, in the defined filtering mode, to a first block of the first color component to generate a first filtered block; and store, in the memory, the first filtered block for a coding unit (CU).

Clause 14B. The device of clause 13B, wherein the one or more processors are configured to: apply the same instance of the NN model, in the defined filtering mode, to a second block of the second color component to generate a second filtered block, wherein to store, the one or more processors are configured to store the first filtered block and the second filtered block for the CU.

Clause 15B. The device of any of clauses 13B or 14B, wherein to receive the syntax element, the one or more processors are configured to receive the syntax element that is applicable to a plurality of CUs, wherein the CU is one of the plurality of CUs.

Clause 16B. The device of any of clauses 13B-15B, wherein the syntax element is a second syntax element, and wherein the one or more processors are configured to: receive a first syntax element, applicable to a plurality of CUs, indicating that the second syntax element is parsed for a subset of CUs of the plurality of CUs, wherein the subset of CUs includes one or more CUs including the CU, wherein to receive the syntax element, the one or more processors are configured to receive the second syntax element based on the first syntax element indicating that the second syntax element is parsed for the subset of CUs.

Clause 17B. The device of any of clauses 13B-16B, wherein the syntax element has a value indicating that NN based filtering is enabled for the first color component.

Clause 18B. The device of clause 17B, wherein the one or more processors are configured to: receive a flag indicating that NN based filtering is enabled for the second color component; and generate a second filtered block based on a second block of the second color component from applying the same instance of the NN model, in the defined filtering mode, to the second block, wherein to store, the one or more processors are configured to store the first filtered block and the second filtered block for the CU.

Clause 19B. The device of clause 17B, wherein the one or more processors are configured to: receive a flag indicating that NN based filtering is disabled for the second color component, wherein to store, the one or more processors are configured to store the first filtered block and a second block of the second color component for the CU.

Clause 20B. The device of any of clauses 13B-19B, wherein the one or more processors are configured to: receive a flag indicating that NN based filtering is enabled for the first color component, wherein to receive the syntax element, the one or more processors are configured to receive the syntax element based on the flag indicating that NN based filtering is enabled for the first color component.

Clause 21B. The device of any of clauses 13B-20B, wherein the syntax element defines which parameter to select from a plurality of parameters, and wherein the defined parameter defines the filtering mode.

Clause 22B. The device of clause 21B, wherein the parameter is a quantization parameter, and the plurality of parameters are one of a pre-defined set or a signaled set.

Clause 23B. The device of any of clauses 13B-22B, wherein the first color component is a first chroma component, and the second color component is a second chroma component.

Clause 24B. The device of any of clauses 13B-23B, wherein to apply the instance of the NN mode, in the defined filtering mode, to the first block of the first color component to generate the first filtered block, the one or more processors are configured to: apply the instance of the NN model, in the defined filtering mode, to the first block of the first color component to generate first residual values; and generate the first filtered block based on the first block and the first residual values.

Clause 25B. A computer-readable storage medium storing instructions thereon that when executed cause one or more processors to: receive a syntax element that defines a filtering mode for a neural network (NN) model for both a first color component and a second color component; apply an instance of the NN model, in the defined filtering mode, to a first block of the first color component to generate a first filtered block; and store the first filtered block for a coding unit (CU).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:

receiving a syntax element that defines a filtering mode for a neural network (NN) model for both a first color component and a second color component, wherein the first color component is a first chroma component, and the second color component is a second chroma component;

applying a single instance of the NN model, in the defined filtering mode, to a first block of the first color component to generate a first filtered block and to a second block of the second color component to generate a second filtered block, wherein applying the single instance of the NN model includes applying a single filtering process jointly to the first block and the second block;

outputting the first filtered block and the second filtered block after applying the single filtering process jointly to the first block and the second block; and storing the first filtered block and the second filtered block for a coding unit (CU).

2. The method of claim 1, wherein receiving the syntax element comprises receiving the syntax element that is applicable to a plurality of CUs, wherein the CU is one of the plurality of CUs.

3. The method of claim 1, wherein the syntax element is a second syntax element, the method further comprising:

receiving a first syntax element, applicable to a plurality of CUs, indicating that the second syntax element is parsed for a subset of CUs of the plurality of CUs, wherein the subset of CUs includes one or more CUs including the CU, wherein receiving the syntax element comprises receiving the second syntax element based on the first syntax element indicating that the second syntax element is parsed for the subset of CUs.

4. The method of claim 1, wherein the syntax element has a value indicating that NN based filtering is enabled for the first color component.

5. The method of claim 4, further comprising:

receiving a flag indicating that NN based filtering is enabled for the second color component.

6. The method of claim 1, further comprising:

receiving a flag indicating that NN based filtering is enabled for the first color component, wherein receiving the syntax element comprises receiving the syntax element based on the flag indicating that NN based filtering is enabled for the first color component.

7. The method of claim 1, wherein the syntax element defines which parameter to select from a plurality of parameters, and wherein the parameter defines the filtering mode.

8. The method of claim 7, wherein the parameter is a quantization parameter, and the plurality of parameters are one of a pre-defined set or a signaled set.

9. The method of claim 1, wherein applying the single instance of the NN mode, in the defined filtering mode, to the first block of the first color component to generate the first filtered block comprises:

applying the single instance of the NN model, in the defined filtering mode, to the first block of the first color component to generate first residual values; and generating the first filtered block based on the first block and the first residual values.

10. A device for processing video data, the device comprising:

memory configured to store the video data; and one or more processors implement in circuitry, coupled to the memory, and configured to:

receive a syntax element that defines a filtering mode for a neural network (NN) model for both a first color component and a second color component, wherein the first color component is a first chroma component, and the second color component is a second chroma component;

apply a single instance of the NN model, in the defined filtering mode, to a first block of the first color component to generate a first filtered block and to a second block of the second color component to generate a second filtered block, wherein to apply the single instance of the NN model, the one or more processors are configured to apply a single filtering process jointly to the first block and the second block;

output the first filtered block and the second filtered block after applying the single filtering process jointly to the first block and the second block; and store, in the memory, the first filtered block and the second filtered block for a coding unit (CU).

11. The device of claim 10, wherein to receive the syntax element, the one or more processors are configured to receive the syntax element that is applicable to a plurality of CUs, wherein the CU is one of the plurality of CUs.

12. The device of claim 10, wherein the syntax element is a second syntax element, and wherein the one or more processors are configured to:

receive a first syntax element, applicable to a plurality of CUs, indicating that the second syntax element is parsed for a subset of CUs of the plurality of CUs, wherein the subset of CUs includes one or more CUs including the CU, wherein to receive the syntax element, the one or more processors are configured to receive the second syntax element based on the first syntax element indicating that the second syntax element is parsed for the subset of CUs.

13. The device of claim 10, wherein the syntax element has a value indicating that NN based filtering is enabled for the first color component.

14. The device of claim 13, wherein the one or more processors are configured to:

receive a flag indicating that NN based filtering is enabled for the second color component.

15. The device of claim 10, wherein the one or more processors are configured to:

receive a flag indicating that NN based filtering is enabled for the first color component, wherein to receive the syntax element, the one or more processors are configured to receive the syntax element based on the flag indicating that NN based filtering is enabled for the first color component.

16. The device of claim 10, wherein the syntax element defines which parameter to select from a plurality of parameters, and wherein the parameter defines the filtering mode.

17. The device of claim 16, wherein the parameter is a quantization parameter, and the plurality of parameters are one of a pre-defined set or a signaled set.

18. The device of claim 10, wherein to apply the single instance of the NN mode, in the defined filtering mode, to the first block of the first color component to generate the first filtered block, the one or more processors are configured to:

apply the single instance of the NN model, in the defined filtering mode, to the first block of the first color component to generate first residual values; and generate the first filtered block based on the first block and the first residual values.

19. A non-transitory computer-readable storage medium storing instructions thereon that when executed cause one or more processors to:

receive a syntax element that defines a filtering mode for a neural network (NN) model for both a first color component and a second color component, wherein the first color component is a first chroma component, and the second color component is a second chroma component;

apply a single instance of the NN model, in the defined filtering mode, to a first block of the first color component to generate a first filtered block and to a second block of the second color component to generate a second filtered block, wherein the instructions that cause the one or more processors to apply the single instance of the NN model comprise instructions that cause the one or more processors to apply a single filtering process jointly to the first block and the second block;

output the first filtered block and the second filtered block after applying the single filtering process jointly to the first block and the second block; and store the first filtered block and the second filtered block for a coding unit (CU).

* * * * *